United States Patent
Amano et al.

(10) Patent No.: US 7,871,167 B2
(45) Date of Patent: Jan. 18, 2011

(54) PROJECTION IMAGE DISPLAY APPARATUS

(75) Inventors: Ryuhei Amano, Hirakata (JP); Takashi Ikeda, Higashi-Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 389 days.

(21) Appl. No.: 12/176,460

(22) Filed: Jul. 21, 2008

(65) Prior Publication Data

US 2009/0040473 A1  Feb. 12, 2009

(30) Foreign Application Priority Data

Aug. 7, 2007  (JP)  ............... 2007-205991
Jun. 4, 2008  (JP)  ............... 2008-147333

(51) Int. Cl.
G03B 21/28  (2006.01)
(52) U.S. Cl. .............. 353/70; 353/99; 359/449
(58) Field of Classification Search ............. 353/50–51, 353/69–70, 77–78, 98–99; 359/449, 862, 359/865

See application file for complete search history.

(56) References Cited

U.S. PATENT DOCUMENTS

| | | |
|---|---|---|
| 6,577,429 B1 | 6/2003 | Kurtz et al. |
| 7,192,142 B2 * | 3/2007 | Yang et al. ............. 353/37 |
| 2005/0264765 A1 | 12/2005 | Yang et al. |
| 2008/0266528 A1 * | 10/2008 | Ikeda et al. ............. 353/69 |

FOREIGN PATENT DOCUMENTS

| | | |
|---|---|---|
| CH | 214749 A | 5/1941 |
| EP | 0633491 A1 | 1/1995 |
| JP | 08-098119 A | 4/1996 |
| JP | 09-005887 A | 1/1997 |
| JP | 2000-171897 A | 6/2000 |
| JP | 2001-255462 A | 9/2001 |
| JP | 2002-262198 A | 9/2002 |
| JP | 2004-045894 A | 2/2004 |
| JP | 2004-85752 A | 3/2004 |
| JP | 2006-113243 A | 4/2006 |

* cited by examiner

Primary Examiner—Kevin Pyo
(74) Attorney, Agent, or Firm—Marvin A. Motsenbocker; Mots Law, PLLC

(57) ABSTRACT

A projection image display apparatus includes a lens unit into which light modulated in accordance with an image signal is entered, a first reflecting mirror having a reflecting surface into which the light passing through the lens unit is entered and by which the light is converged, a second reflecting mirror for reflecting the light reflected by the first reflecting mirror, and a mirror actuator for changing a tilt angle of the second reflecting mirror with respect to the light.

7 Claims, 19 Drawing Sheets

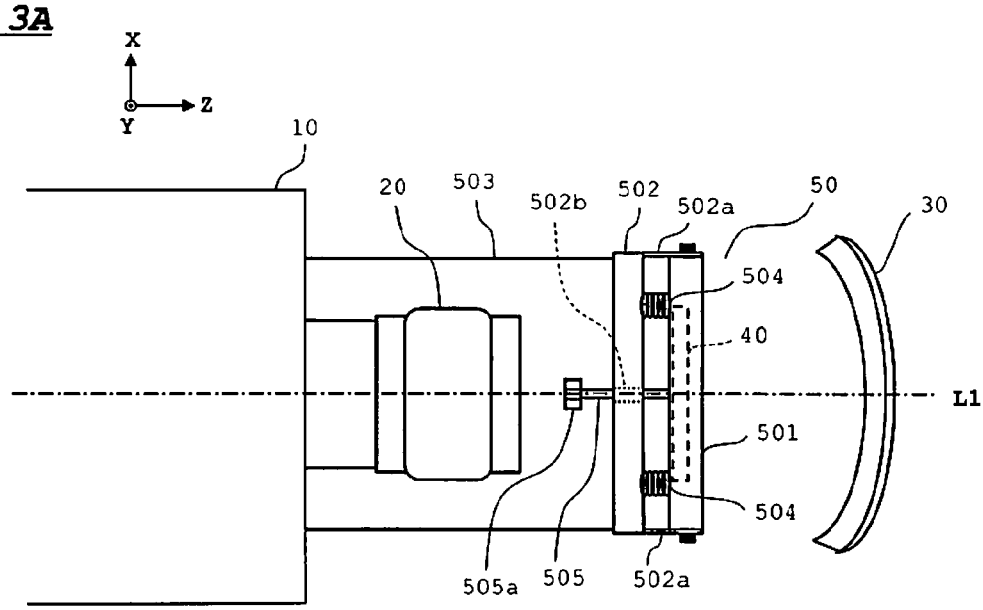
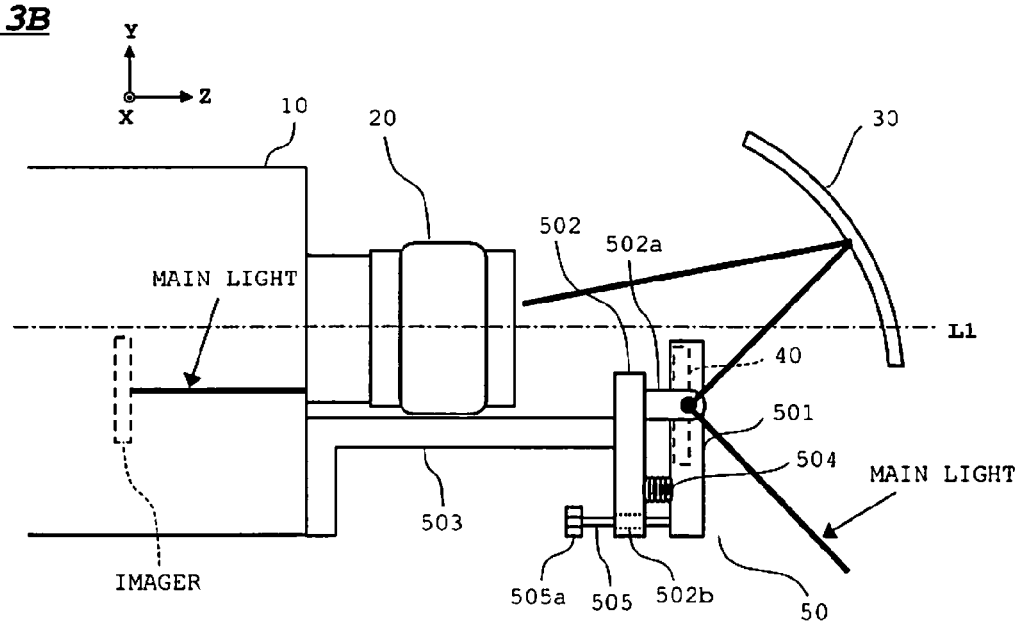

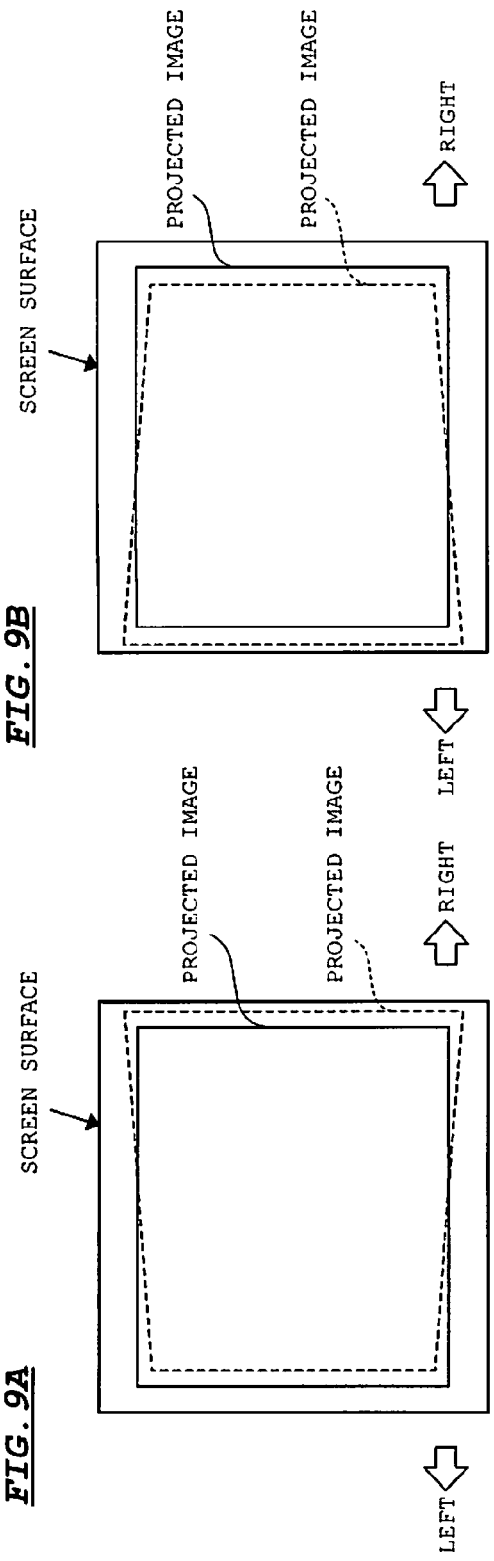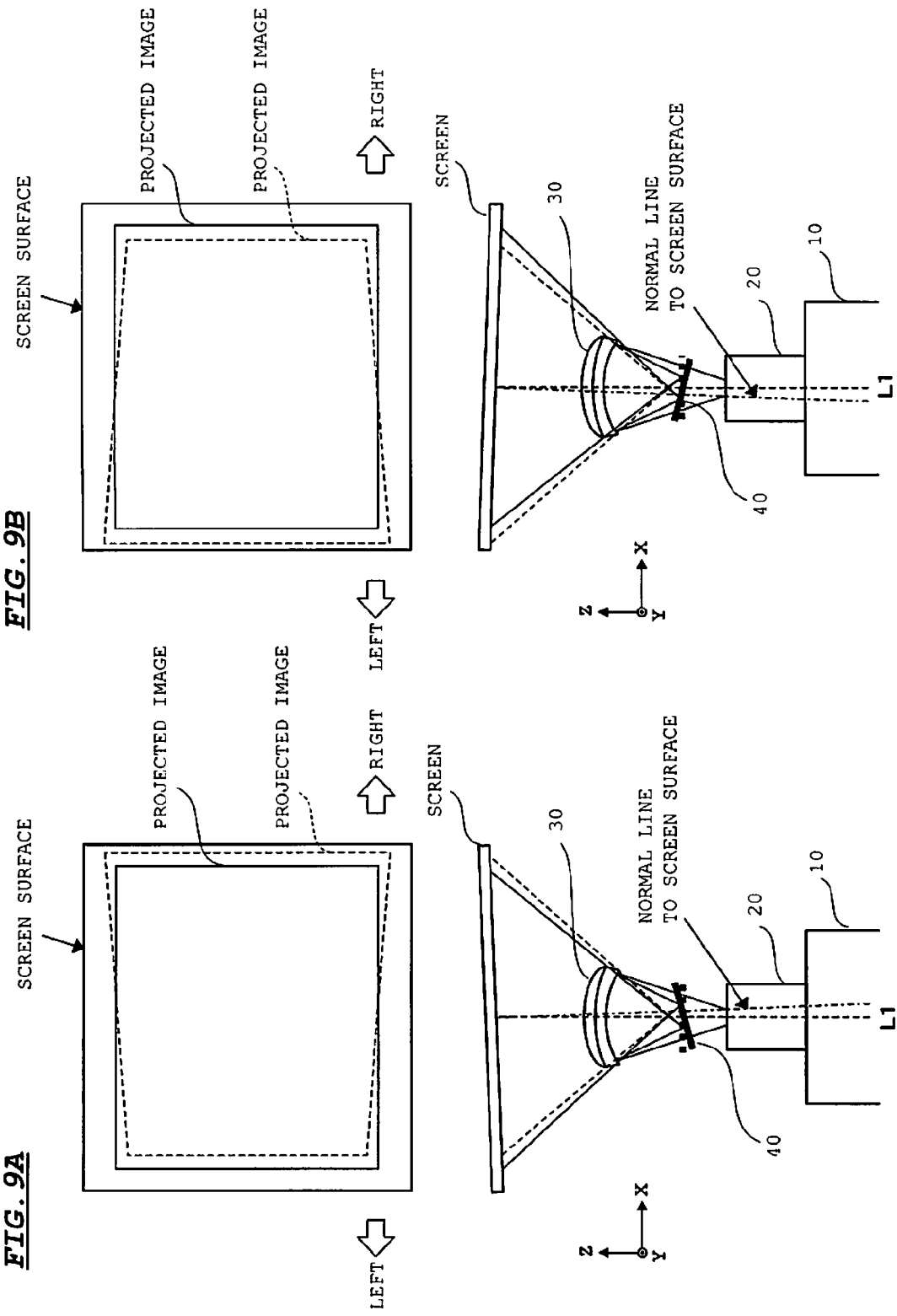

FIG. 19A
IMAGE ON SCREEN
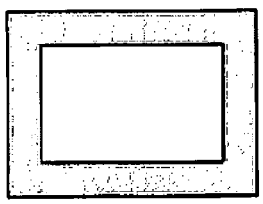
CAPTURED IMAGE
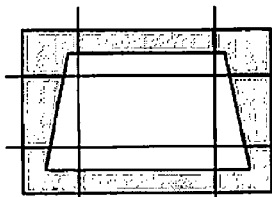
|Cw−Dw|≧TH1
FIG. 19B
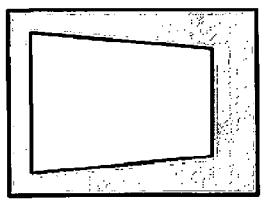
Cw−Dw>TH1
FIG. 19C
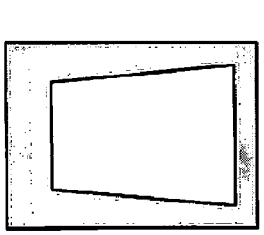
Dw−Cw>TH1
FIG. 19D
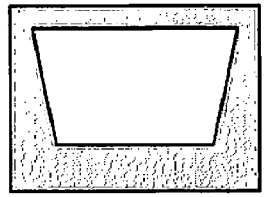
Aw'−Bw>TH2
FIG. 19E
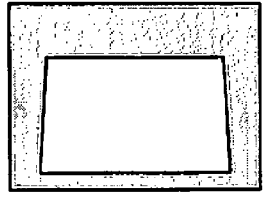
Bw−Aw'>TH2

PROJECTION IMAGE DISPLAY APPARATUS

This application claims priority under 35 U.S.C. Section 119 of Japanese Patent Application No. 2007-205991 filed Aug. 7, 2007, entitled "PROJECTION IMAGE DISPLAY APPARATUS" and Japanese Patent Application No. 2008-147333 filed Jun. 4, 2008, entitled "PROJECTION IMAGE DISPLAY APPARATUS".

BACKGROUND OF THE INVENTION

1. Field of the Invention

The present invention relates to a projection image display apparatus for magnifying and projecting an image on an imager onto a projection plane and, more particularly, is suitable for use in a projection image display apparatus that projects projection light onto a projection plane in an oblique direction.

2. Description of the Related Art

There have been commercialized and widely prevalent a projection image display apparatus (hereinafter referred to as "projector") for magnifying and projecting an image on an imager (such as a liquid crystal panel) onto a projection plane (such as a screen). This kind of projector may cause a trapezoidal distortion in a projected image due to a discrepancy between a direction of an optical axis of a projection lens and a direction of a normal line to a projection plane. For correction of such a distortion, an installation state of a projector body may be adjusted such that the direction of the optical axis of the projection lens comes closer to the direction of the normal line to the projection plane, or an angle-adjustable reflecting mirror may be provided on a rear side of the projection lens so that an angle of the reflecting mirror can be adjusted so as to reduce the distortion. Alternatively, there is a method by which an image drawn on an imager is adjusted by signal processing. An image shaped so as to eliminate a distortion in advance is generated and drawn on the imager.

Although light from a projector is conventionally projected onto a screen in a front direction, there has recently been introduced a type of projector that projects projection light onto a screen in an oblique direction. By projecting projection light onto a screen from an oblique direction, this kind of projector reduces a possibility that the projection light is cut off by an obstacle such as a person and a shadow is cast on an image, as compared with image projection in a front direction. In addition, this kind of projector relieves a problem in that a person making a presentation near a screen suffers from the glare of light from the projector.

Such a trapezoidal distortion as described above becomes more pronounced when an incident angle of projection light is increased with respect to the normal line to a screen surface. Accordingly, when projection light is projected in an oblique direction as stated above, a trapezoidal distortion appears more prominently, as compared with the case where projection light is projected in a front direction.

In this case, although the trapezoidal distortion may be corrected by signal processing as stated above, there will occur a problem in that a resolution of the projected image deteriorates significantly. Further, in correcting the trapezoidal distortion by adjusting an installation state of the projector, only a slight change in the installation state greatly changes a position of a projected image, which causes a problem in that it is extremely difficult to let a projected image contained in a screen surface while correcting the trapezoidal distortion.

Moreover, in correcting the trapezoidal distortion by reflecting projection light by an angle-adjustable reflecting mirror, there will cause a problem in that the reflecting mirror needs to have a larger area as a tilting angle of projection light is increased with respect to the normal line to a screen plane, which leads to upsizing of the reflecting mirror. In this case, upsizing the reflecting mirror would cause a drive actuator in the reflecting mirror to be larger in size, resulting in the upsizing of the overall projector.

SUMMARY OF THE INVENTION

Accordingly, an object of the present invention is to allow smooth correction of a trapezoidal distortion by a small-sized reflecting mirror.

A projection image display apparatus in a main aspect of the present invention includes: a lens unit into which light modulated in accordance with an image signal is entered; a first mirror having a reflecting surface into which the light passing through the lens unit is entered and by which the light is converged; a second mirror for reflecting the light reflected by the first mirror; and a mirror actuator for changing a tilt angle of the second mirror with respect to the light.

According to the present invention, since light is converged by the first mirror, light incident on the second mirror can be reduced in size, which leads to miniaturization of the second mirror. Accordingly, the mirror actuator for driving the second mirror can be made compact, thereby preventing the upsizing of the overall projector.

In the present invention, the second mirror may be disposed in a first light path between the first mirror and a position of convergence of the light by the first mirror, or in a second light path between the position of convergence and a position where a light path length of the first light path is exceeded. More preferably, the second mirror is disposed in the position of convergence of the light by the first mirror. It is noted that the term "position of convergence" refers to a position where the light becomes smallest in size.

In the present invention, by disposing the second mirror such that the light path of the light reflected by the second mirror intersects with the light path of the light passing through the lens unit, it is possible to shorten a distance (a distance H in a direction of a Z axis in FIG. 11) between a projection image display apparatus and a projection plane (screen surface) as shown in FIG. 11, for example.

BRIEF DESCRIPTION OF THE DRAWINGS

The foregoing and other objectives and novel features of the present invention will be more fully understood from the following description of the preferred embodiments when reference is made to the accompanying drawings.

FIG. 3A is a diagram (top view) showing a configuration of a mirror actuator in the first embodiment;

FIG. 3B is a diagram (side view) showing a configuration of the mirror actuator in the first embodiment;

FIG. 9A is a diagram showing an adjustment example of a tilt of a second reflecting mirror in correcting a horizontal trapezoidal distortion (right trapezoidal distortion) in a projector of the second embodiment;

FIG. 9B is a diagram showing an adjustment example of a tilt of the second reflecting mirror in correcting a horizontal trapezoidal distortion (left trapezoidal distortion) in the projector of the second embodiment;

FIG. 19A is a diagram (with no trapezoidal distortion) showing a relationship between a projected image on a screen and an image captured by an image capturing device and illustrating a method of distortion correction in the projector of the fourth embodiment;

FIG. 19B is a diagram (with a left trapezoidal distortion) showing a relationship between a projected image on a screen and an image captured by the image capturing device and illustrating a method of distortion correction in the projector of the fourth embodiment;

FIG. 19C is a diagram (with a right trapezoidal distortion) showing a relationship between a projected image on a screen and an image captured by the image capturing device and illustrating a method of distortion correction in the projector of the fourth embodiment;

FIG. 19D is a diagram (with an upper trapezoidal distortion) showing a relationship between a projected image on a screen and an image captured by the image capturing device and illustrating a method of distortion correction in the projector of the fourth embodiment; and FIG. 19E is a diagram (with a lower trapezoidal distortion) showing a relationship between a projected image on a screen and an image captured by the image capturing device and illustrating a method of distortion correction in the projector of the fourth embodiment.

However, the drawings are intended only for the purpose of illustration and do not restrict the scope of the present invention.

DESCRIPTION OF THE PREFERRED EMBODIMENTS

Preferred embodiments of the present invention will now be described with reference to the drawings.

First Embodiment

Figure 1:
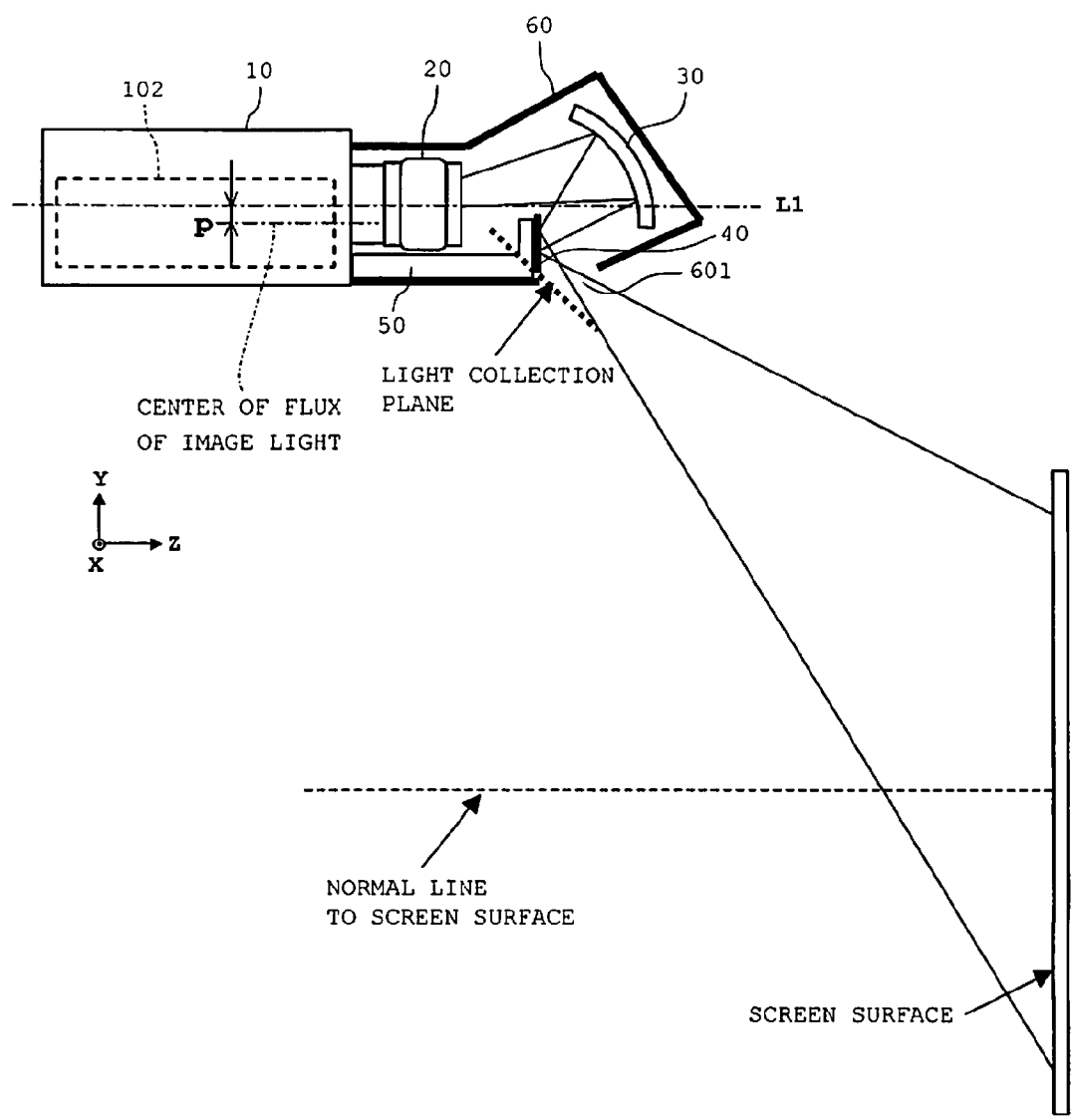
FIG. 1 is a diagram showing a configuration of a projector in a first embodiment.

FIG. 1 is a diagram showing a configuration of a projector in a first embodiment. As shown in the diagram, the projector includes an enclosure 10, a lens unit 20, a first reflecting mirror 30, a second reflecting mirror 40, a mirror actuator 50, and a cover 60.

The enclosure 10 accommodates an optical engine 102 which generates image light modulated in accordance with an image signal. The generated image light is entered from the optical engine 102 into the lens unit 20. The image light here is entered into the lens unit 20 such that a center of flux thereof is shifted by a predetermined distance p from a light axis L1 of the lens unit 20. The image light passing through the lens unit 20 is converged by the first reflecting mirror 30 having an a spherical or free-form concave reflecting surface.

The second reflecting mirror 40 has a flat-plate shape and is disposed in the vicinity of a convergence position (collecting plane) of the image light passing through the first reflecting mirror 30. The second reflecting mirror 40 is here disposed such that a reflecting surface thereof is almost perpendicular to the light axis of the lens unit 20. The image light from the first reflecting mirror 30 is reflected by the second reflecting mirror 40 and projected onto a projection plane (screen surface) as shown in FIG. 1.

The second reflecting mirror 40 is here supported by the mirror actuator 50 in such a manner as to be rotatable in an in-plane direction of a Y-Z plane. As discussed later, if an image on a screen surface experiences a trapezoidal distortion, the trapezoidal distortion is controlled by making an adjustment to a tilt angle of the second reflecting mirror 40.

The cover 60 accommodates the lens unit 20, the first reflecting mirror 30, the second reflecting mirror 40, and the mirror actuator 50. The cover 60 is provided with a window 601 through which the image light reflected by the second reflecting mirror 40 passes. In addition, the cover 60 has an opening (not shown) for operating an adjustment screw (described later) in the mirror actuator 50.

As imagers disposed in the optical engine 102, transmissive liquid crystal panels, reflective liquid crystal panels or MEMS devices can be employed.

Figure 2:
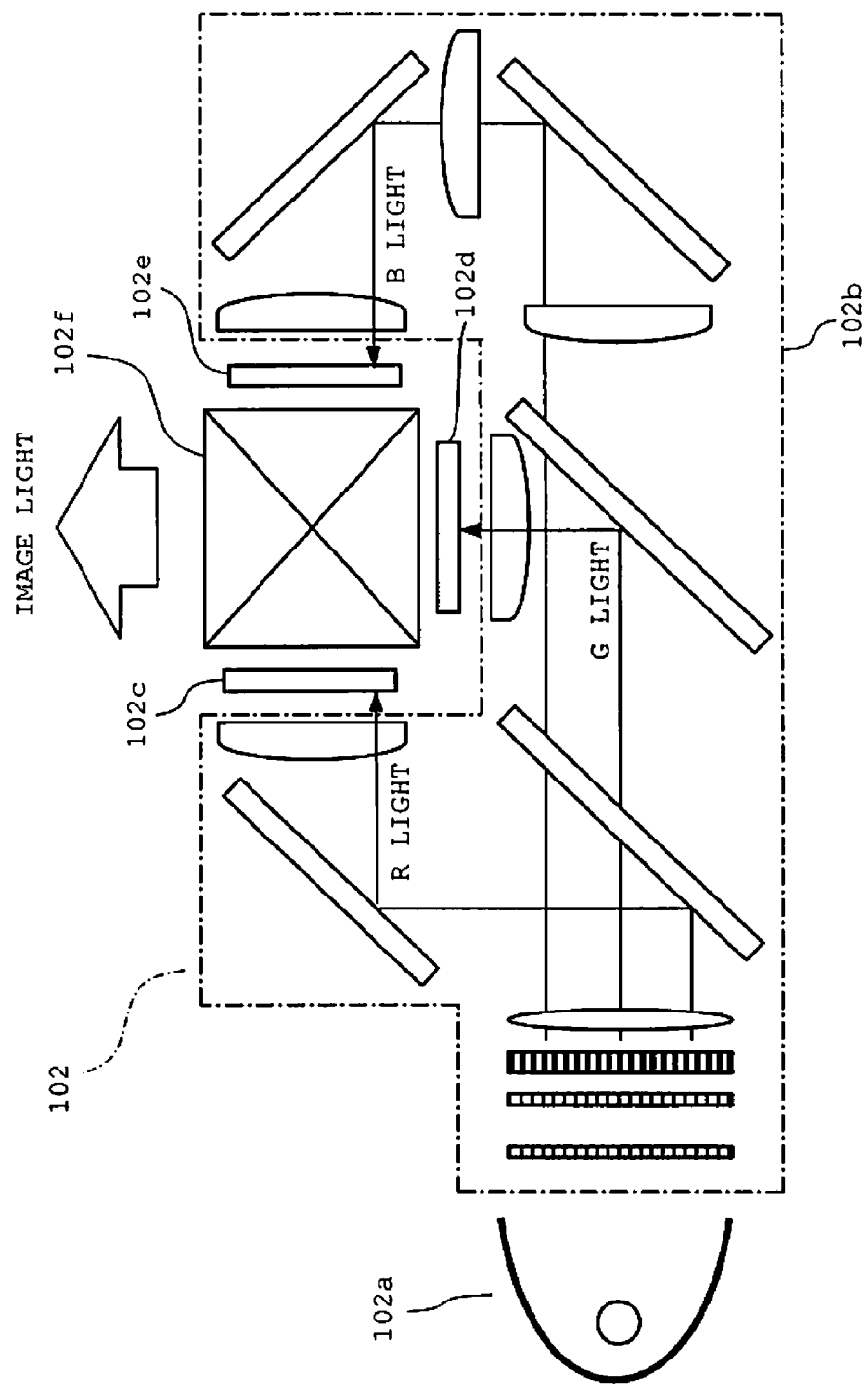
FIG. 2 is a diagram showing a configuration of an optical engine in the first embodiment.

FIG. 2 is a diagram showing an exemplary configuration of the optical engine 102 using transmissive liquid crystal panels as imagers.

White light emitted from a light source 102a is divided by a light-guiding optical system 102b into light in a red wavelength band (hereinafter referred to as "R light"), light in a green wavelength band (hereinafter referred to as "G light") and light in a blue wavelength band (hereinafter referred to as "B light"), and applied to liquid crystal panels 102c, 102d and 102e. The R light, G light and B light modulated by the liquid crystal panels 102c, 102d and 102e are combined by a dichroic prism 102f and entered as image light into the lens unit 20.

FIG. 3 is a diagram showing a configuration of the mirror actuator 50. FIG. 3A is a top view of main parts of the projector with the cover omitted, and FIG. 3B is a side view of the main parts of the projector with the cover omitted.

The mirror actuator 50 includes a mirror holding plate 501, a supporting plate 502, a holding plate 503, a spring 504, and an adjustment screw 505. The second reflecting mirror 40 is attached to the mirror holding plate 501. The mirror holding plate 501 has the shape of a flat square with a concave formed in a surface thereof. The second reflecting mirror 40 is fitted into and fixed at the concave.

The mirror holding plate 501 is pivotally supported by a bearing 502a of the supporting plate 502 in such a manner as to be rotatable in the in-plane direction of the Y-Z plane. In addition, the mirror holding plate 501 is biased by two springs 504 in a direction that a lower part thereof becomes closer to the supporting plate 502.

The supporting plate 502 has a screw hole 502b formed and the adjustment screw 505 is screwed into the screw hole 502b. An end of the adjustment screw 505 projects from the supporting plate 502 and contacts a back surface of the mirror holding plate 501. This regulates rotation of the mirror holding plate 501 and fixes a position of the mirror holding plate 501. The supporting plate 502 is attached via the holding plate 503 to the enclosure 10.

The adjustment screw 505 has a knob 505a formed. For example, turning the knob 505a in a clockwise direction allows the end of the adjustment screw 505 to move ahead toward the mirror holding plate 501, and turning the knob 505a in a counterclockwise direction allows the end of the adjustment screw 505 to move backward from the mirror holding plate 501.

When a reflecting surface of the second reflecting mirror 40 is perpendicular to the light axis L1 of the lens unit 20 (initial state), moving the adjustment screw 505 forward causes the lower part of the mirror holding plate 501 to be pressed and turned by the adjustment screw 505 in a counterclockwise direction from a state shown in FIG. 3B, whereby the reflecting surface of the second reflecting mirror 40 is tilted upward from the initial state. In contrast, moving the adjustment screw 505 backward causes the lower part of the mirror holding plate 501 to be pulled and turned by the screw 504 in a clockwise direction, whereby the reflecting surface of the second reflecting mirror 40 is tilted downward from the initial state.

As shown in FIG. 3B, a center of rotation of the second reflecting mirror 40, that is, a position of pivotal supporting of the mirror holding plate 501 is supposed to be a position where a chief ray of light passing through a central position of an imager disposed in the optical engine 102 is entered into the second reflecting mirror 40.

FIG. 4 is a diagram showing an adjustment example of a tilt of the second reflecting mirror 40 in correcting a vertical trapezoidal distortion.

Figure 4A:
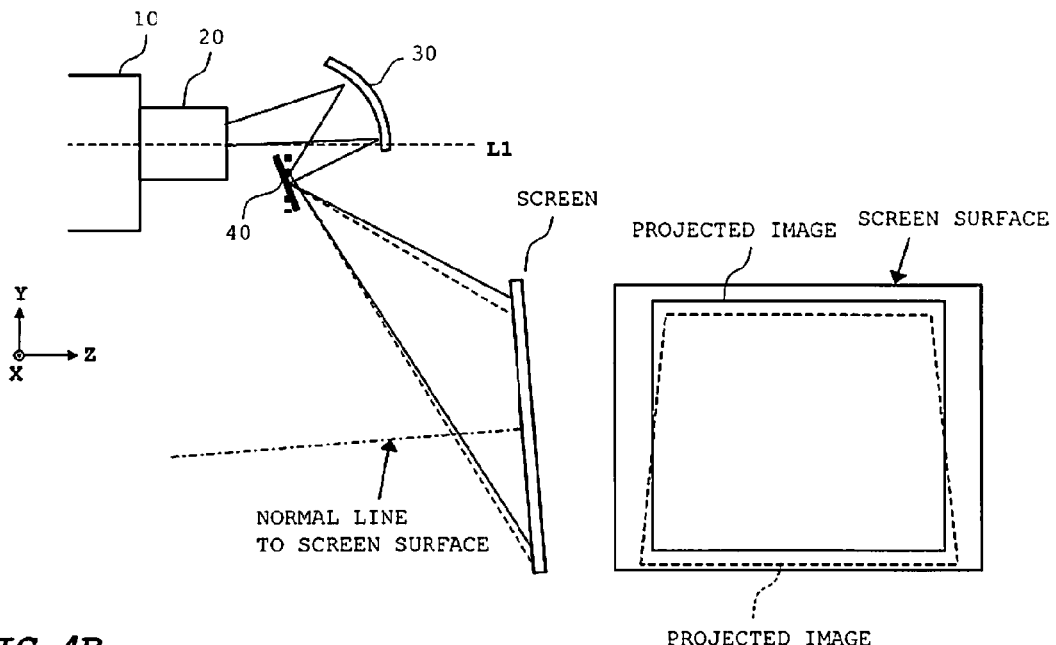
FIG. 4A is a diagram showing an adjustment example of a tilt of a second reflecting mirror in correcting a vertical trapezoidal distortion (lower trapezoidal distortion) in the projector of the first embodiment.

When the light axis L1 of the lens unit 20 agrees with a normal line to the screen surface, a projected image on a screen surface experiences no trapezoidal distortion. However, as shown in FIG. 4A, if the screen surface is tilted downward and the normal line thereto is tilted downward with respect to the light axis L1 of the lens unit 20, a trapezoidal distortion with a short upper base and a long lower base (hereinafter referred to as "lower trapezoidal distortion") is generated in a projected image, as shown by dashed lines in FIG. 4A. In addition, the projected image is vertically extended, and becomes larger than the case in which the image is not tilted vertically (in height).

If a lower trapezoidal distortion occurs as above, the user operates the adjustment screw 505 to tilt the reflecting surface of the second reflecting mirror 40 upward from the initial state as shown in FIG. 4A. Accordingly, the projected image shifts in an upward direction in the screen and decreases gradually in difference of degree of magnification between upper and lower parts, thereby correcting the lower trapezoidal distortion. As above, when the lower trapezoidal distortion is eliminated and the projected image is turned into a proper shape as shown by solid lines in FIG. 4A, the user stops operating the adjustment screw 505 to fix the second reflecting mirror 40 in that position. The projected image is reduced in height with the upward shift, and in a state where the trapezoidal distortion is eliminated, the image is the same in height as a projected image with no tilt of the normal line to the screen surface with respect to the light axis L1 of the lens unit 20.

Figure 4B:
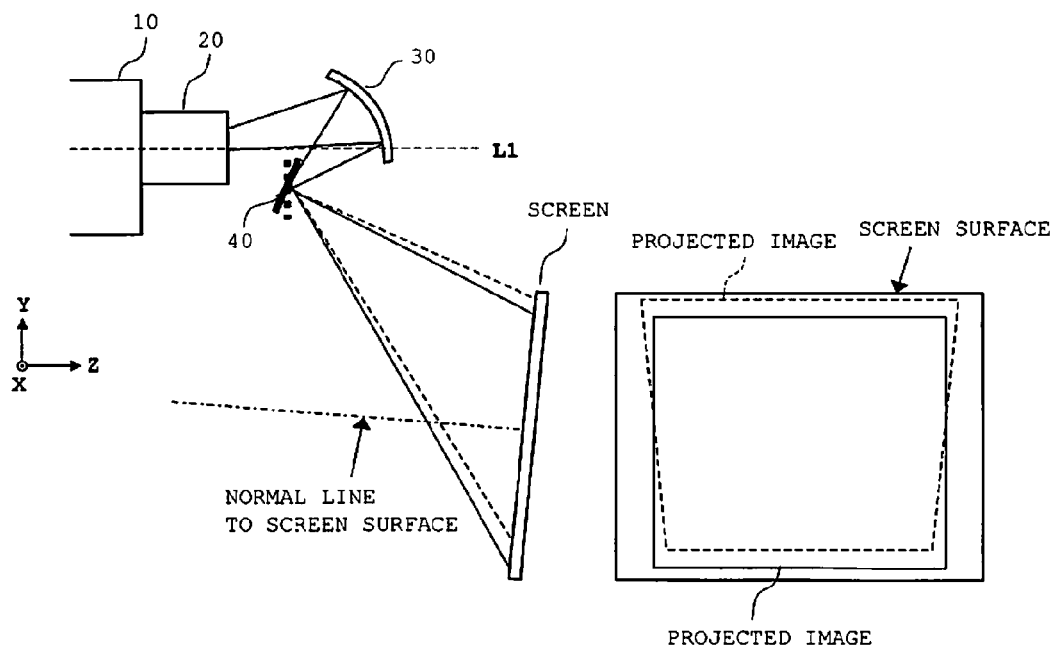
FIG. 4B is a diagram showing an adjustment example of a tilt of a second reflecting mirror in correcting a vertical trapezoidal distortion (upper trapezoidal distortion) in the projector of the first embodiment.

On the other hand, as shown in FIG. 4B, when the screen surface is tilted upward and the normal line thereto is tilted upward with respect to the light axis L1 of the lens unit 20, a trapezoidal distortion with a long upper base and a short lower base (hereinafter referred to as "upper trapezoidal distortion") occurs in a projected image as shown by dashed lines in FIG. 4B. In addition, the projected image is vertically extended and becomes larger than the case in which the image is not tilted vertically (in height).

In this case, the user operates the adjustment screw 505 to tilt the reflecting surface of the second reflecting mirror 40 downward from the initial state as shown in FIG. 4B. Accordingly, the projected image shifts downward in the screen and gradually decreases in difference of degree of magnification between upper and lower parts, thereby correcting the upper trapezoidal distortion. As above, when the upper trapezoidal distortion is eliminated and the projected image is turned into a proper shape as shown by solid lines in FIG. 4B, the user stops operating the adjustment screw 505 to fix the second reflecting mirror 40 in that position. The projected image is reduced in height with the downward shift, and in a state where the trapezoidal distortion is eliminated, the image is the same in height as a projected image with no tilt of the normal line to the screen surface with respect to the light axis L1 of the lens unit 20.

In a configuration of this embodiment, trapezoidal distortions can be smoothly corrected by adjusting a tilt of the second reflecting mirror 40 with the mirror actuator 50. At the same time, vertical extension of a projected image can be eliminated.

Further, since the reflecting surface of the first reflecting mirror 30 is configured to converge light, a flux of light entering the second reflecting mirror 40 is reduced in size as compared with a flux of light entering the first reflecting mirror 30. This allows the second reflecting mirror 40 to be miniaturized. Accordingly, it is also possible to downsize the mirror actuator 50 driving the second reflecting mirror 40 and avoid upsizing of the overall projector.

FIGS. 5 to 7 illustrates differences in size among trapezoidal distortions and the like that occur with a projector using only a lens unit (a projector projecting light onto a screen in an oblique direction) and a projector using a lens unit and a reflecting mirror (the same type as this embodiment) when the projectors are tilted by the same angle with respect to the normal line to the screen surface.

Figure 5A:
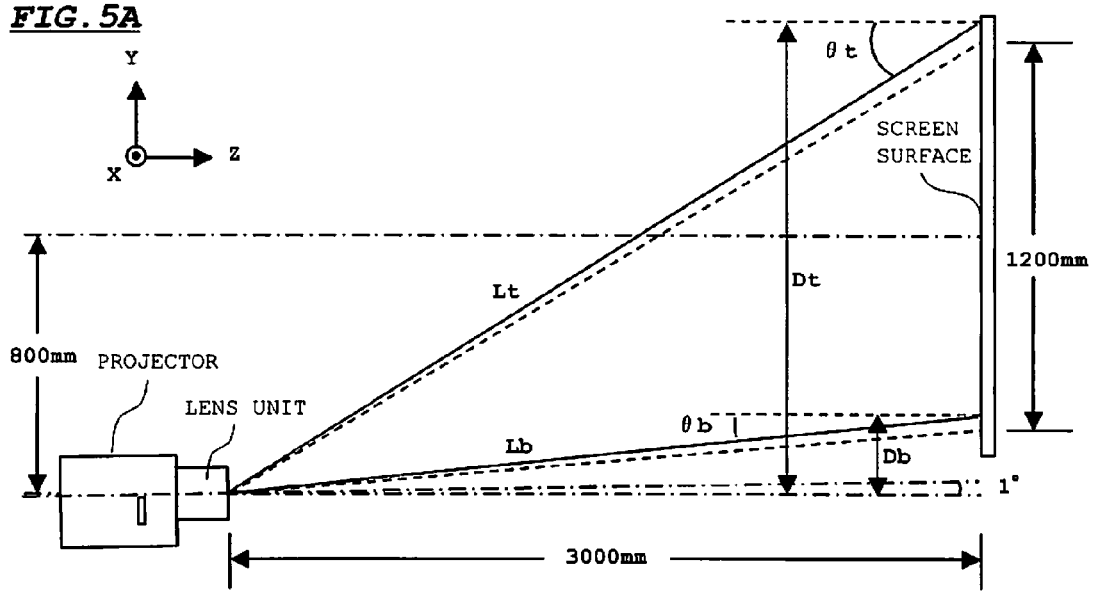
FIG. 5A is a diagram (side view) illustrating a state of a projected image when the projector using only a lens unit is tilted by 1°.
Figure 5B:
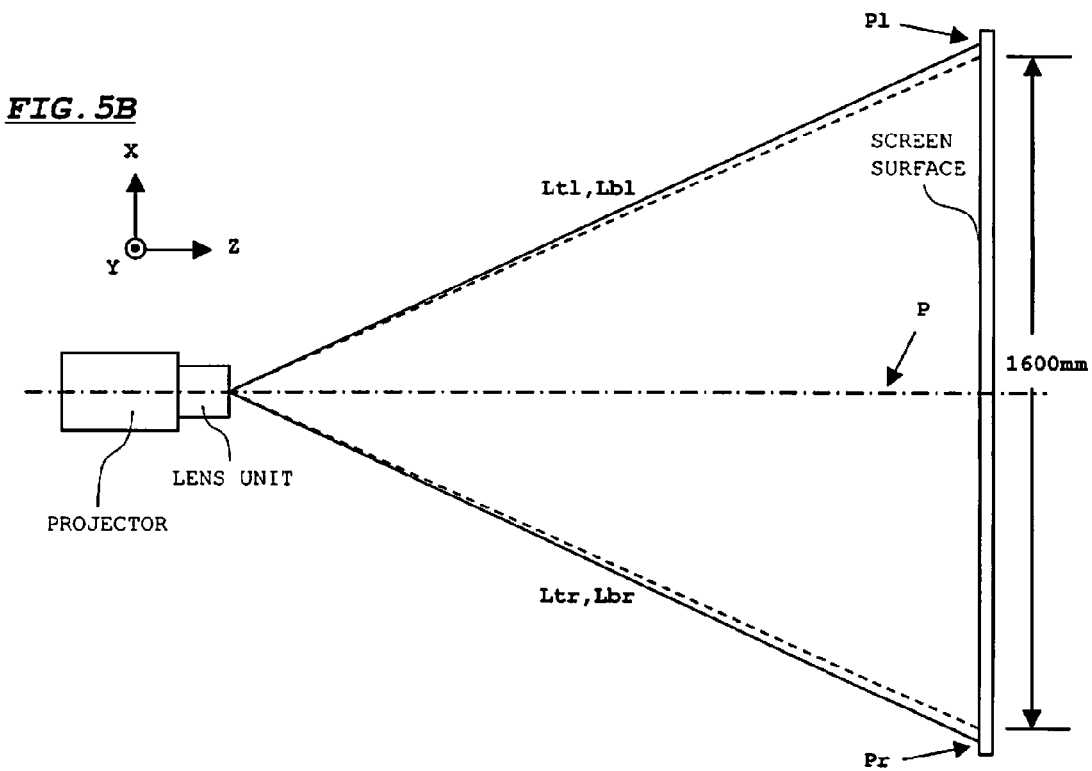
FIG. 5B is a diagram (top view) illustrating a state of a projected image when the projector using only the lens unit is tilted by 1°.
Figure 6A:
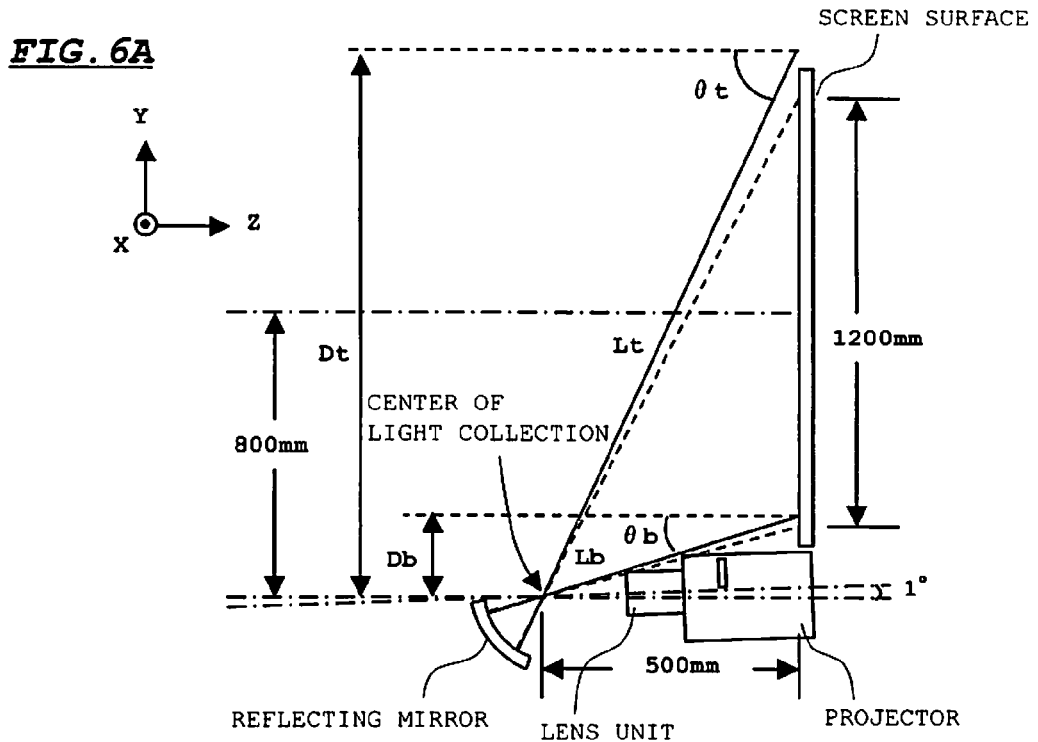
FIG. 6A is a diagram (side view) illustrating a state of a projected image when the projector using the lens unit and the reflecting mirror is tilted by 1°.
Figure 6B:
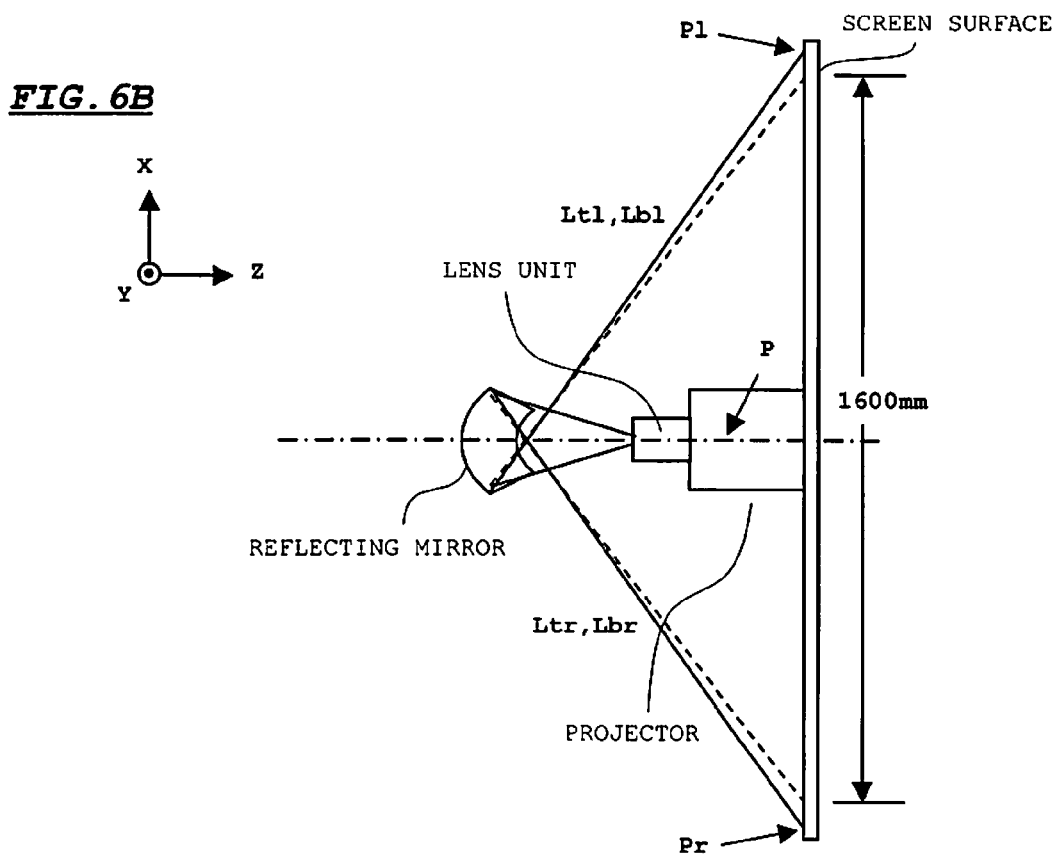
FIG. 6B is a diagram (top view) illustrating a state of a projected image when the projector using the lens unit and the reflecting mirror is tilted by 1°.
Figure 7A:
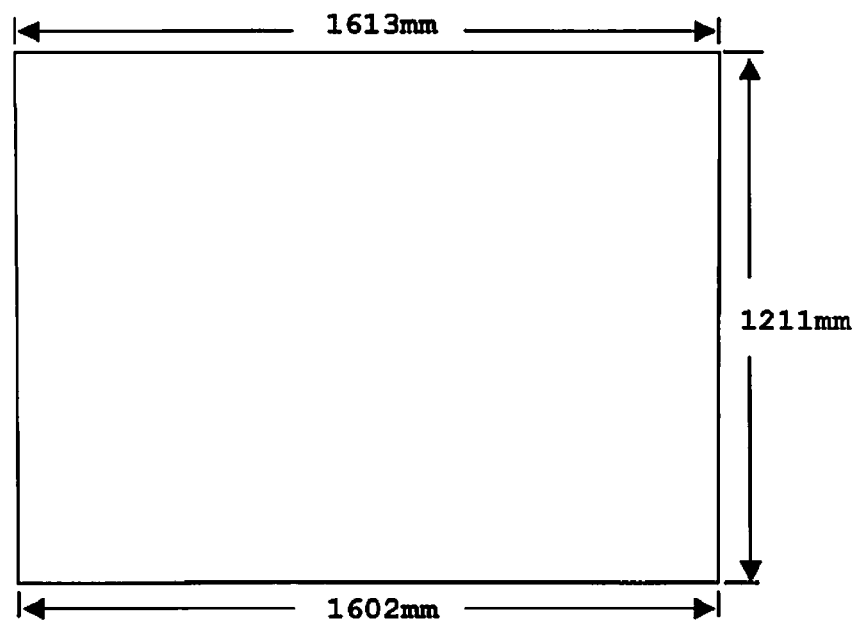
FIG. 7A is a diagram showing a shape of a projected image when the projector using only the lens unit is tilted by 1°.
Figure 7B:
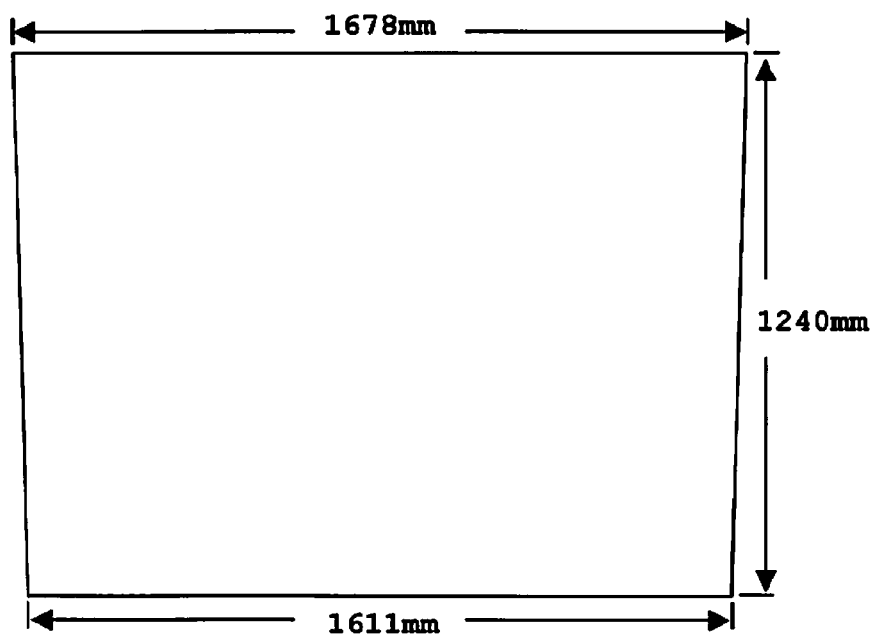
FIG. 7B is a diagram showing a shape of a projected image when the projector using the lens unit and the reflecting mirror is tilted by 1°.

FIG. 5 is a diagram illustrating a state of a projected image when the projector using only the lens unit is tilted by 1°, and FIGS. 5A and 5B are side and top views of the projector and the screen, respectively. FIG. 6 is a diagram illustrating a state of a projected image when the projector using a lens unit and a reflecting mirror is tilted by 1°, and FIGS. 6A and 6B are side and top views of the projector and the screen, respectively. FIG. 7A is a front view showing a shape of a projected image when the projector using only the lens unit is tilted by 1°, and FIG. 7B is a front view showing a shape of a projected image when the projector using the lens unit and the reflecting mirror is tilted by 1°.

First, referring to FIG. 5, description will be given as to a case where the projector using only the lens unit is tilted by 1°. In this case, it is assumed that a throw distance is 3,000 mm and an image of 80 inches (4:3) is projected. The throw distance here constitutes a distance between one of lenses forming the lens unit of the projector which is closest to the screen (hereinafter referred to as "front lens") and the screen surface.

For the sake of simplicity, it is assumed that image light is projected from a central point of the front lens in the lens unit onto the screen, the projected image is set to be 1,200 mm high and 1,600 mm wide, and a distance between the normal line to the screen surface extending from the center of the projected image and the light axis of the lens unit is set at 800 mm.

Under these conditions, when the projector is not tilted (light from the projector is as shown by dashed lines), a distance Dt from the light axis of the lens unit to an upper end of the projected image and a distance Dd from the light axis of the lens unit to a lower end of the projected image are determined as follows:

$Dt=800+(1,200/2)=1,400$ mm $Db=800-(1,200/2)=200$ mm

In addition, when the projector is not tilted, a light angle θt and a light length Lt of upper light, and a light angle θb and a light length Lb of lower light with respect to a center P of a projected image in a horizontal direction (direction of an X axis) are determined as follows:

$θt=\tan^{-1}(1,400/3,000)=$ about 25°

$θb=\tan^{-1}(200/3,000)=$ about 3.8°

$Lt=3,000/\cos 25°=3,310.1$ mm $Lb=300/\cos 3.8°=3,006.6$ mm

Then, description will be provided as to a case where the projector is tilted by 1° in a counterclockwise direction with respect to FIG. 5A from the foregoing state. For the sake of simplicity, it is assumed that the projector is rotated around the central point of the front lens in the lens unit.

When the projector is tilted by 1°, light from the projector is brought into a state shown by solid lines in FIG. 5A. In this case, since θt=about 26° and θb=about 4.8°, the distances Dt and Db are determined as follows:

$Dt=3,000×\tan 26°=$ about 1,463 mm $Dt=3,000×\tan 4.8°=$ about 252 mm

Therefore, the projected image is vertically extended and an amount of the extension ΔD is determined as follows:

$ΔD=(1,463-1,400)-(252-200)=11$ mm

Further, with the tilt of 1°, light lengths Lt and Lb and amounts of increase of light lengths ΔLt and ΔLb from those with no tilt are determined as follows:

$Lt=3,000/\cos 26°=3,337.8$ mm $Lb=3,000/\cos 4.8°=3,010.6$ mm $ΔLt=3,337.8-3,310.1=27.7$ mm $ΔLb=3,010.6-3,006.6=4.0$ mm As foregoing, since the amount of increase of light length in the upper end of the projected image is larger than that in the lower end of the projected image, the projected image experiences a trapezoidal distortion in which an upper-end width of the projected image is longer than a lower-end one. As in the case with the light lengths Lt and Lb with respect to the center P of the projected image in a horizontal direction (direction of the X axis), amounts of increase in light lengths Ltl and Ltr of upper light and amounts of increase in light lengths Lbl and Lbr of lower light are calculated in both ends Pl and Pr of the projected image, and based on the calculations, a light position at the both ends Pl and Pr of the upper light and a light position at the both ends Pl and Pr of the lower light are determined at a rough estimate. As a result, the amount of increase in the lower-end width of the projected image is about 2 mm, and the amount of increase in the upper-end width of the projected image is about 13 mm.

Accordingly, as shown in FIG. 7A, when the projector using only the lens unit is tilted by 1°, the height of the projected image is extended to 1,211 mm with an increase of 11 mm. In addition, with occurrence of a trapezoidal distortion, the upper-end width of the projected image is 1,613 mm and the lower-end width thereof is 1,602 mm.

As above, in the projector shown in FIG. 5, the amount of vertical extension ΔD of the projected image with respect to the amount of a tilt of the projector does not become so large. Accordingly, in adjusting the height of the projector to project an image onto a desired position in the screen surface, even if the projector is slightly tilted around the X axis with respect to a horizontal plane, the upper end of the projected image can hardly go off the screen.

Further, even if the projector is slightly tilted, a resulting trapezoidal distortion (a dimension difference between the upper-end and lower-end widths of the image) is relatively small and can be eliminated by making a correction with signal processing, for example, a keystone correction.

Therefore, in the projector using only the lens unit, even if the projector is slightly tilted and a vertical extension or a trapezoidal distortion is generated in a projected image, it is possible to project a rectangular image within an effective region on the screen by merely making a keystone correction.

Next, referring to FIG. 6, description will be provided as to a case where the projector using the lens unit and the reflecting mirror is tilted by 1°. In this example, it is assumed that a throw distance is 500 mm and an image with a size of 80 inches (4:3) is projected. The throw distance here constitutes a distance from a center of collection of light reflected by the reflecting mirror to the screen surface.

For the sake of simplicity, it is assumed that image light is projected from the center of collection of light onto the screen, the projected image is set to be 1,200 mm high and 1,600 mm wide, and a distance between the normal line to the screen extending from the center of the projected image and the light axis of the lens unit is set at 800 mm.

Under these conditions, the distance Dt is 1,400 mm and the distance Db is 200 mm, as in the foregoing case. In addition, when the projector is not tilted (light from the projector is as shown by dashed lines), the light angle θt, light angle θb, light length Lt and light length Lb are determined as follows:

$$\theta t = \tan^{-1}(1,400/500) = \text{about } 70°$$

$$\theta b = \tan^{-1}(200/500) = \text{about } 22°$$

$$Lt = 500/\cos 70° = 1,461.9 \text{ mm}$$

$$Lb = 500/\cos 22° = 539.3 \text{ mm}$$

Then, description will be provided as to a case where the projector is tilted by 1° in a counterclockwise direction with respect to FIG. 6A from the foregoing state. For the sake of simplicity, it is assumed that the projector is rotated around the center of collection of light.

When the projector is tilted by 1°, light from the projector is brought into a state shown by solid lines in FIG. 6A. In this case, since θt=about 71° and θb=about 23°, the distances Dt and Db are determined as follows:

$$Dt = 500 \times \tan 71° = \text{about } 1,452 \text{ mm}$$

$$Db = 500 \times \tan 23° = \text{about } 212 \text{ mm}$$

Therefore, the projected image is vertically extended and the amount of the extension AD is determined as follows:

$$\Delta D = (1,452-1,400)-(212-200) = 40 \text{ mm}$$

Further, with the tilt of 1°, the light lengths Lt and Lb and amounts of increase of light lengths ΔLt and ΔLb from those with no tilt are determined as follows:

$$Lt = 500/\cos 71° = 1,535.8 \text{ mm}$$

$$Lb = 500/\cos 23° = 543.2 \text{ mm}$$

$$\Delta Lt = 1,535.8 - 1,461.9 = 73.9 \text{ mm}$$

$$\Delta Lb = 543.2 - 539.3 = 3.9 \text{ mm}$$

As foregoing, since the amount of increase of light length in the upper end of the projected image is greatly larger than that in the lower end of the projected image, the projected image experiences a trapezoidal distortion in which an upper-end width of the projected image is greatly longer than a lower-end one. As in the case with the light lengths Lt and Lb with respect to the center P of the projected image in a horizontal direction (direction of the X axis), amounts of increase in the light lengths Ltl and Ltr of upper light and amounts of increase in the light lengths Lbl and Lbr of lower light are calculated in both ends Pl and Pr of the projected image, and based on the calculations, a light position at the both ends Pl and Pr of the upper light and a light position at the both ends Pl and Pr of the lower light are determined at a rough estimate. As a result, the amount of increase in the lower-end width of the projected image is about 11 mm, and the amount of increase in the upper-end width of the projected image is about 78 mm.

Accordingly, as shown in FIG. 7B, when the projector using the lens unit and the reflecting mirror is tilted by 1°, the height of the projected image is extended to 1,240 mm with an increase of 40 mm. In addition, with occurrence of a trapezoidal distortion, the upper-end width of the projected image is 1,678 mm and the lower-end width thereof is 1,611 mm.

As above, in the projector shown in FIG. 6, the amount of vertical extension ΔD of the projected image with respect to the amount of a tilt of the projector becomes significantly large as compared with the projector shown in FIG. 5. Accordingly, in adjusting the height of the projector so as to project an image onto a desired position in the screen surface, if the projector is only slightly tilted around the X axis with respect to a placement plane (horizontal plane), the upper end of the projected image may go off the screen.

Further, even with a slight tilt of the projector, a resulting trapezoidal distortion (a dimension difference between the upper-end and lower-end widths of the image) is relatively large. It is thus difficult to eliminate such a trapezoidal distortion by making a correction with signal processing, for example, a keystone correction.

With a keystone correction, pixels in an upper portion of a projected image is thinned out in projection by signal processing such that a long upper-end width becomes the same with a lower-end width of the image, which deteriorates image quality of the upper portion of the image displayed on a screen. Accordingly, when a trapezoidal distortion is relatively small with a minor difference in dimension between the upper-end and lower-end widths, pixels are not thinned out so much and little image degradation occurs. In contrast, when a trapezoidal distortion is large with a major difference in dimension between the upper-end and lower-end widths, a large number of pixels are thinned out and significant image degradation takes place, thereby exerting a negative influence on viewing of an audience. For this reason, it is not desirable to make a keystone correction to a large trapezoidal distortion as shown in FIG. 7B.

As above, if a projector using a lens unit and a reflecting mirror is slightly tilted and thus a vertical extension or trapezoidal distortion occurs in a projected image, it is difficult to project a rectangular image in an effective region of the screen by use of a keystone correction.

Meanwhile, in a configuration of this embodiment, the mirror actuator 50 is allowed to adjust a tilt of the second reflecting mirror 40 as stated above, so that it is easy to eliminate a trapezoidal distortion and prevent a vertical extension in a projected image without degradation in image quality. As a result, it is possible to project a rectangular image smoothly in an effective region of the screen.

Second Embodiment

Figure 8A:
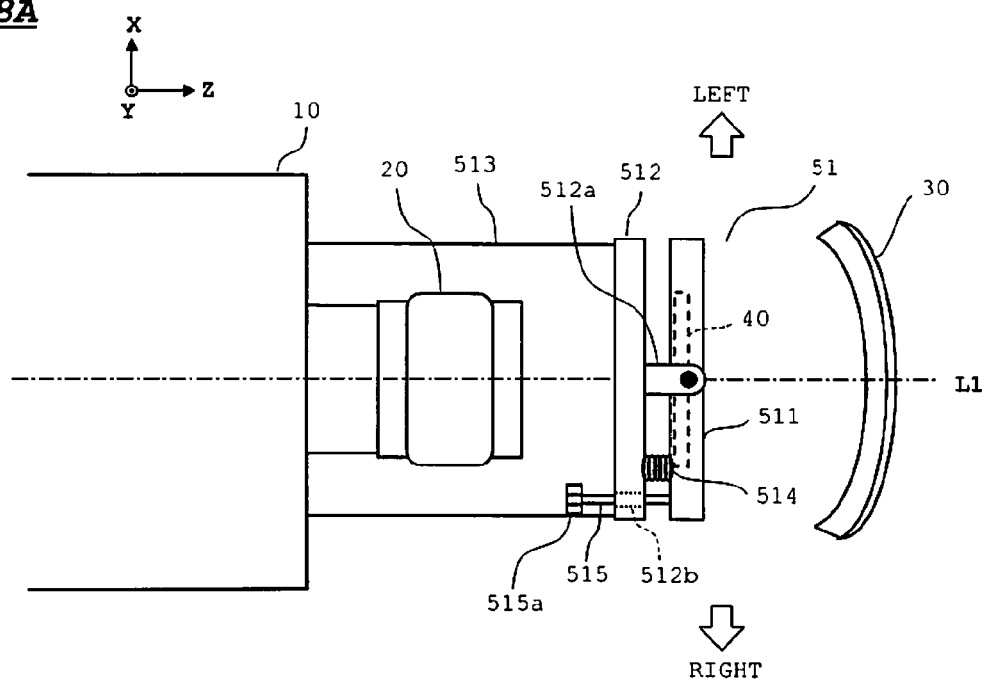
FIG. 8A is a diagram (top view) showing a configuration of a mirror actuator in a second embodiment.
Figure 8B:
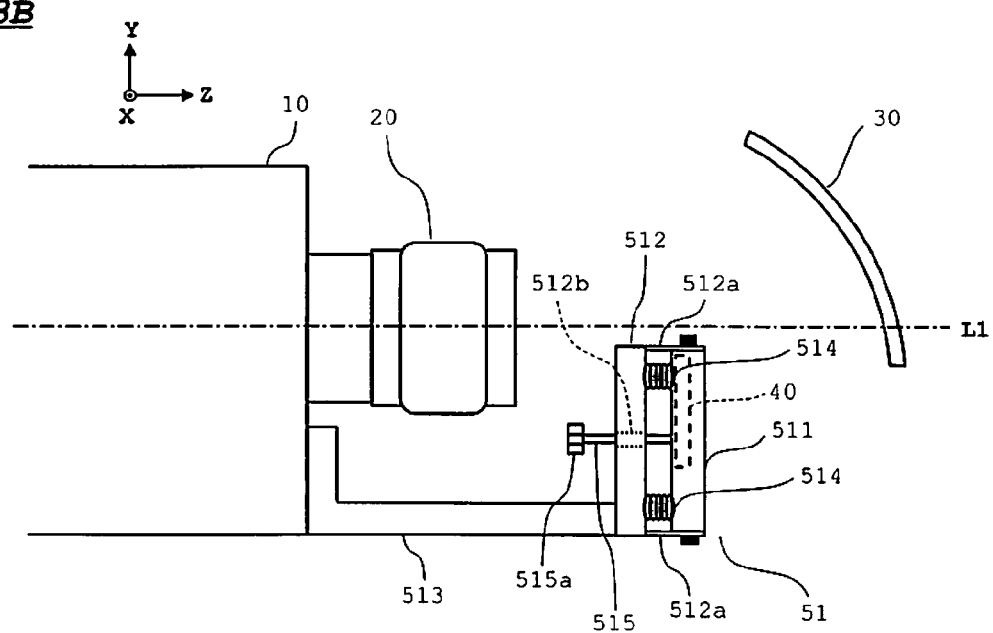
FIG. 8B is a diagram (side view) showing the configuration of the mirror actuator in the second embodiment.

FIG. 8 is a diagram showing a configuration of a projector in the second embodiment. FIG. 8A is a top view of main parts of the projector with a cover omitted, and FIG. 8B is a side view of the main parts of the projector with the cover omitted.

The projector of this embodiment is the same with the first embodiment except for the structure of the mirror actuator. Therefore, the same components of the second embodiment as those of the first embodiment are given the same reference numerals and not described here.

The mirror actuator 51 includes a mirror holding plate 511, a supporting plate 512, a holding plate 513, a spring 514, and an adjustment screw 515.

In the mirror actuator 51, the mirror holding plate 511 is pivotally supported by a bearing 512a of the supporting plate 512 so as to be rotatable in an in-plane direction of an X-Z plane. Accordingly, placement positions of the spring 514 and adjustment screw 515 are different from those in the foregoing embodiment.

When the second reflecting mirror 40 is perpendicular to the light axis L1 of the lens unit 20 (initial state), a knob 515a is turned to move the adjustment screw 515 forward, a right end of the mirror holding plate 511 is pressed by the adjustment screw 515 and rotates in a counterclockwise direction from a state shown in FIG. 8A, which tilts the reflecting plane of the second reflecting mirror 40 in a counterclockwise direction from the initial state. On the other hand, when the adjustment screw 515 is moved backward, the right end of the mirror holding plate 511 is pulled by the spring 514 and rotates in a clockwise direction, causing the reflecting plane of the second reflecting mirror 40 to tilt in a clockwise direction from the initial state.

In the mirror actuator 51 as well as the foregoing mirror actuator 50, a center of rotation of the second reflecting mirror 40, that is, a position of pivotal support of the mirror holding plate 511 is in a position where main light passing through a central position of an imager disposed in the optical engine 102 enters the second reflecting mirror 40.

FIG. 9 is a diagram showing an adjustment example of tilt of the second reflecting mirror 40 in correcting a horizontal trapezoidal distortion.

As shown in FIG. 9A, when the screen surface is tilted in a counterclockwise direction of FIG. 9A and a normal line thereto is tilted in a counterclockwise direction with respect to the light axis L1 of the lens unit 20, a trapezoidal distortion with a long right side and a short left side (hereinafter referred to as "right trapezoidal distortion") occurs in a projected image on the screen surface, as shown by dashed lines in FIG. 9A.

In this case, a user may operate the adjustment screw 515, as shown in FIG. 9A, to tilt the reflecting plane of the second reflecting mirror 40 in a counterclockwise direction of FIG. 9A from the initial state to thereby eliminate the right trapezoidal distortion.

On the other hand, when the screen surface is tilted in a clockwise direction of FIG. 9B and a normal line thereto is tilted in a clockwise direction with respect to the optical axis L1 of the lens unit 20 as shown in FIG. 9B, a trapezoidal distortion with a long left side and a short right side (hereinafter referred to as "left trapezoidal distortion") occurs in a projected image on the screen surface as shown by dashed lines in FIG. 9B. In this case, the user may operate the adjustment screw 515, as shown in FIG. 9B, to tilt the reflecting plane of the second reflecting mirror 40 in a clockwise direction of FIG. 9B from the initial state to thereby eliminate the left trapezoidal distortion.

In a configuration of this embodiment, it is possible to smoothly correct a trapezoidal distortion as in the first embodiment. In addition, it is possible to miniaturize the second reflecting mirror 40 and the mirror actuator 51 and prevent upsizing of the overall projector.

Figure 10:
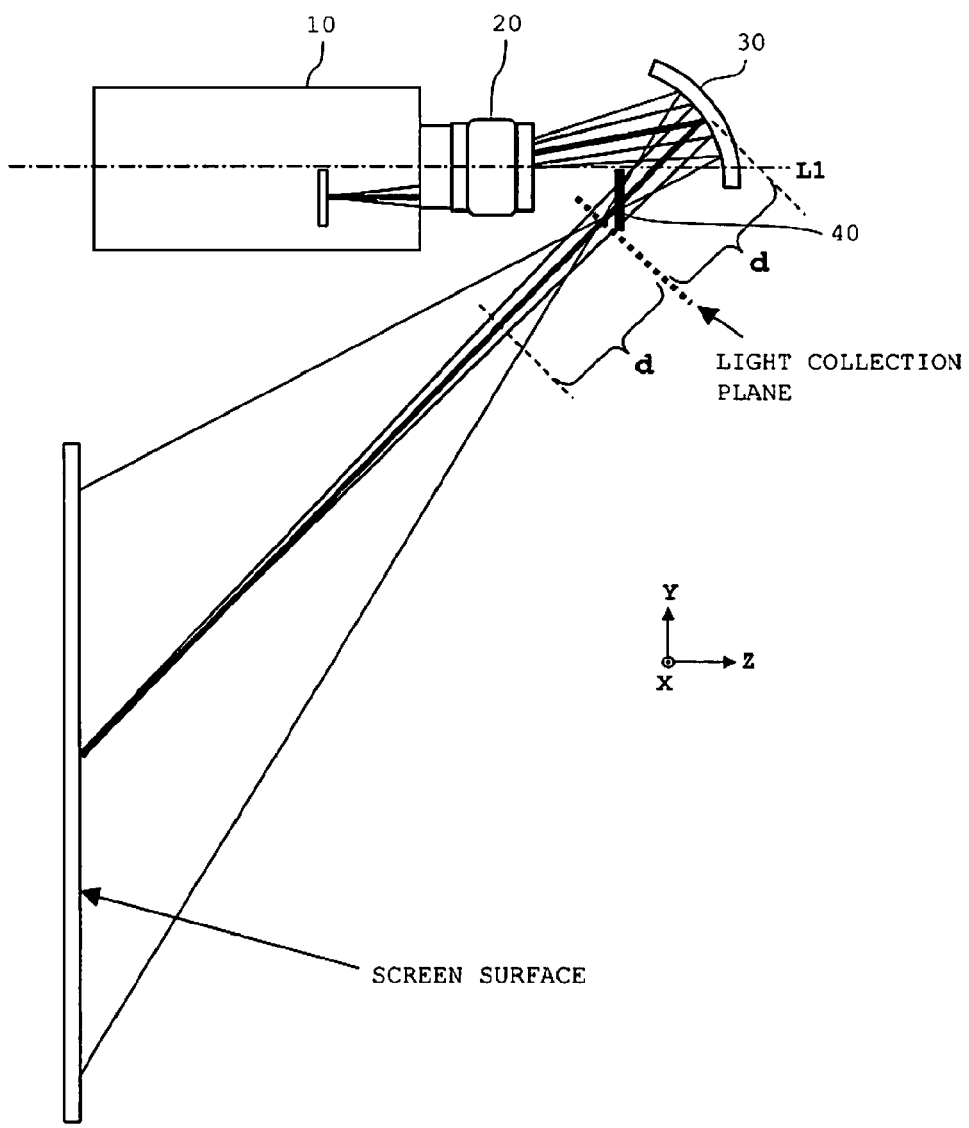
FIG. 10 is a diagram illustrating placement of the second reflecting mirror.

In the first and second embodiments, the second reflecting mirror 40 is disposed in the vicinity of a position at which image light is converged by the first reflecting mirror 30 (light collection plane). In this case, the second reflecting mirror 40 may be disposed within a range of a first light path between the first reflecting mirror 30 and the light collection plane and a second light path between the light collection plane and a position where a light path length d of the first light path is exceeded, as shown in FIG. 10 for example. In a light path closer to the screen than the second light path, a beam size of light becomes larger than a beam size of light entering the first reflecting mirror 30, which leads to upsizing of the second reflecting mirror 40. Thus, by disposing the second reflecting mirror 40 within a range of the first and second light paths, it is possible to avoid the foregoing inconvenience and reduce the size of the second reflecting mirror 40.

More preferably, the second reflecting mirror 40 is disposed in a position at which image light is converged by the first reflecting mirror 30 (a position where a light flux becomes smallest in size) or as nearest the position as possible. This allows the second reflecting mirror 40 to be significantly compact, thereby achieving miniaturization of the mirror actuators 50 and 51.

By combining a configuration of the actuator 50 in the first embodiment with a configuration of the actuator 51 in the second embodiment, it is possible to correct trapezoidal distortions in vertical and horizontal directions.

Third Embodiment

Figure 11:
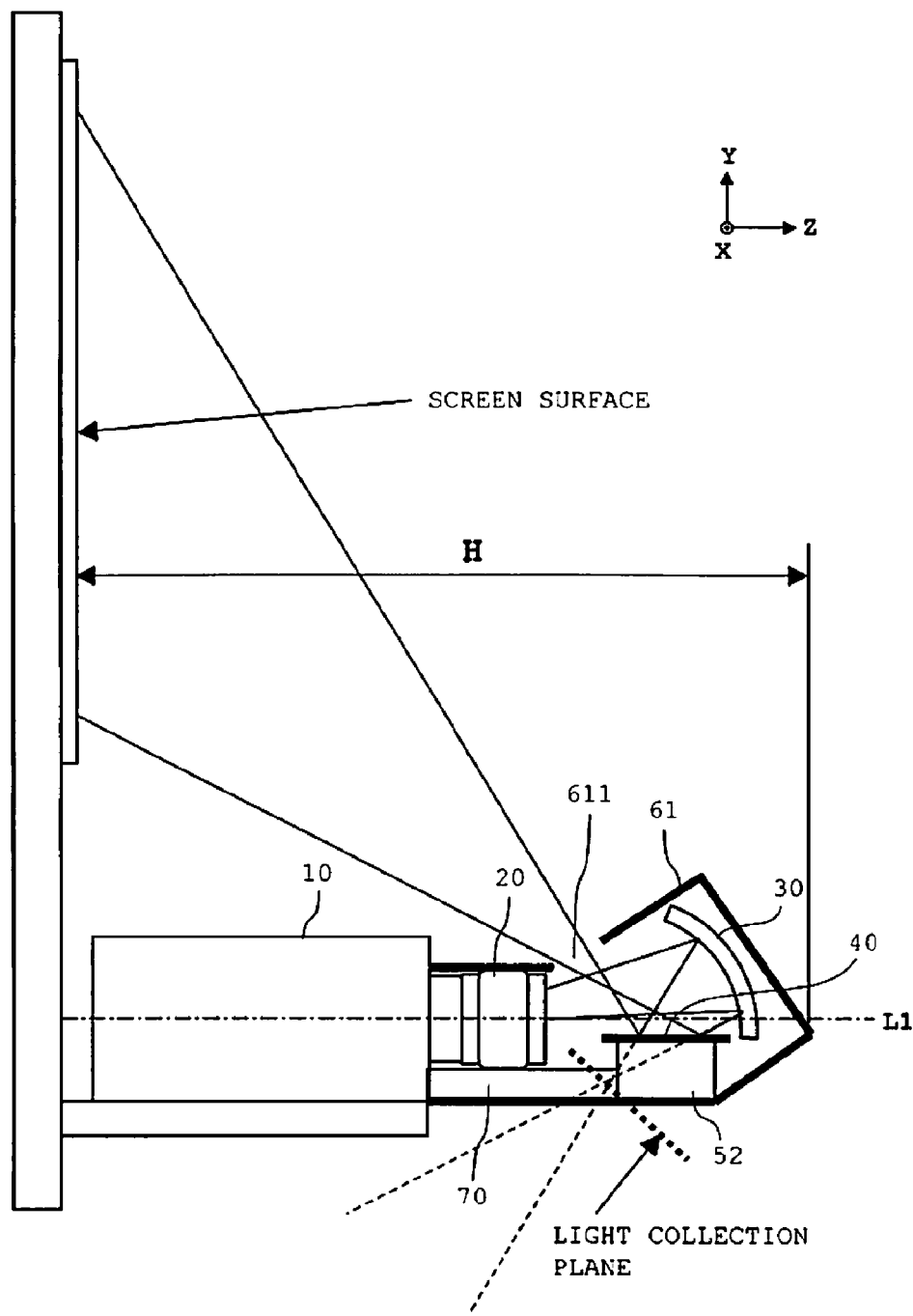
FIG. 11 is a diagram illustrating a configuration of a projector in a third embodiment.

FIG. 11 is a diagram showing a configuration of a projector in the third embodiment. The projector of this embodiment is different from those of the first and second embodiments, in an orientation of the second reflecting mirror and a structure of the mirror actuator. The same components in the third embodiment as those in the first and second embodiments are given the same reference numerals and are not described here.

As shown in FIG. 11, the second reflecting mirror 40 is disposed such that the reflecting plane thereof is in almost parallel to the light axis L1 of the lens unit 20. Accordingly, image light reflected by the second reflecting mirror 40 intersects a light path of image light traveling from the lens unit 20 toward the first reflecting mirror 30, passes through a window 611 formed in an upper surface of the cover 61, and then is projected onto a screen plane. As above, by folding image light back, it is possible to shorten a distance between the projector and the screen plane (a distance H in FIG. 11), as compared with the first and second embodiments.

The second reflecting mirror 40 is rotatably supported by the mirror actuator 52 in an in-plane direction of an X-Y plane and an in-plane direction of a Y-Z plane. The mirror actuator 52 is electrically driven by the drive unit 70.

Figure 12:
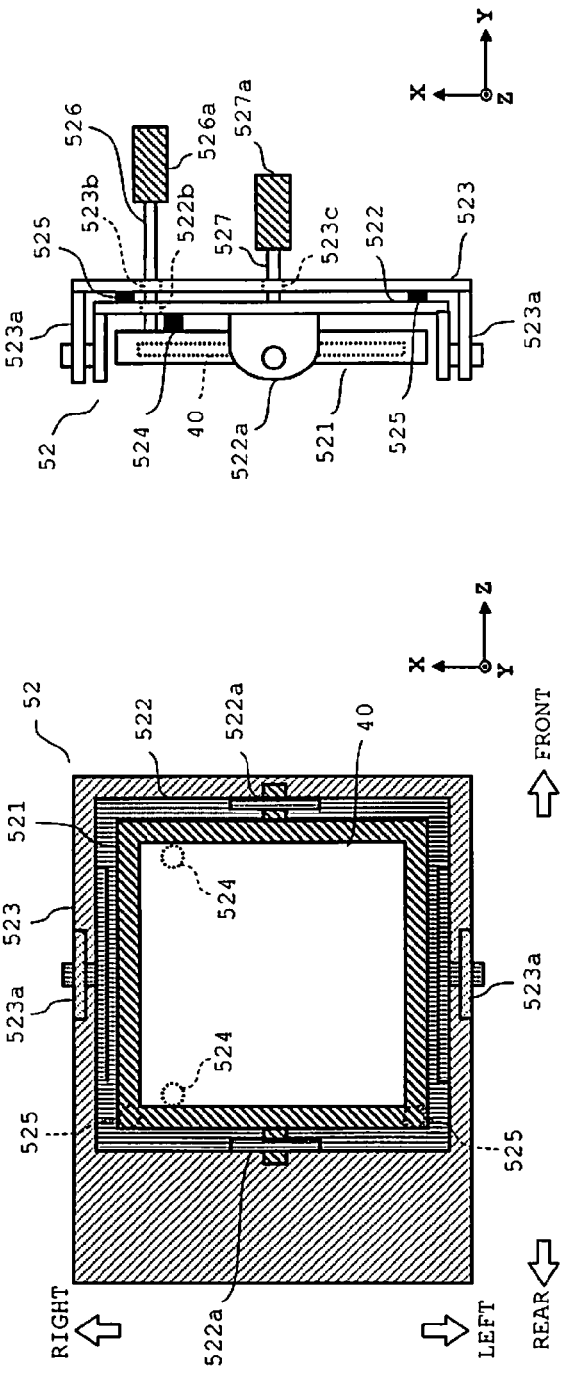
FIG. 12A is a diagram (top view) showing a configuration of a mirror actuator in the third embodiment.
FIG. 12B is a diagram (side view) showing the configuration of the mirror actuator in the third embodiment.
FIG. 12C is a diagram (front view) showing the configuration of the mirror actuator in the third embodiment.

FIG. 12 is a diagram showing a configuration of the mirror actuator 52. FIG. 12A is a top view, FIG. 12B is a side view of FIG. 12A as seen from a front side, and FIG. 12C is a side view of FIG. 12A as seen from a left side. In FIG. 12A, constitutional members are hatched for convenience of identification.

The mirror actuator 52 includes a mirror holding plate 521, a first supporting plate 522, a second supporting plate 523, a first spring 524, a second spring 525, a first adjustment pin 526, and a second adjustment pin 527.

The second reflecting mirror 40 is attached to the mirror holding plate 521. The mirror holding plate 521 has the shape of a flat square with a concave formed in a surface thereof. The second reflecting mirror 40 is fitted into and fixed at the concave.

The mirror holding plate 521 is pivotally supported by a bearing 522a of the first supporting plate 522 in such a manner as to be rotatable in the in-plane direction of an X-Y plane. In addition, the mirror holding plate 521 is biased by the two springs 524 in a direction that a right part thereof becomes closer to the first supporting plate 522.

The first supporting plate 522 is pivotally supported by a bearing 523a of the second supporting plate 523 in such a manner as to be rotatable in the in-plane direction of an Y-Z plane. In addition, the first supporting plate 522 is biased by the two springs 525 in a direction that a rear part thereof becomes closer to the second supporting plate 523.

The second supporting plate 523 has two pin holes 523b and 523c formed. In addition, the first supporting plate 522 has a pin hole 522b formed in a position corresponding to the pin hole 523b in the second supporting plate 523.

The first adjustment pin 526 is supported by a supporting member (not shown) in such a manner as to be displaceable in a direction of a Y axis, and an end thereof passes through the pin holes 522b and 523b and contacts a lower surface of the mirror holding plate 521. This regulates rotation of the mirror holding plate 521 and fixes a position of the mirror holding plate 521. The pin hole 522b in the first supporting plate 522 is long in a direction of a Z axis. Therefore, when the first supporting plate 522 rotates, the pin hole 522b does not hit on the first adjustment pin 526.

The second adjustment pin 527 is supported by a supporting member (not shown) in such a manner as to be displaceable in the direction of the Y axis, and an end thereof passes through the pin hole 523c and contacts a lower surface of the first supporting plate 522. This regulates rotation of the first supporting plate 522 and fixes a position of the first supporting plate 522.

The first and second adjustment pins 526 and 527 are driven by the drive unit 70. Accordingly, worm gears 526a and 527a are attached to lower end parts of the adjustment pins 526 and 527, respectively.

Figure 13:
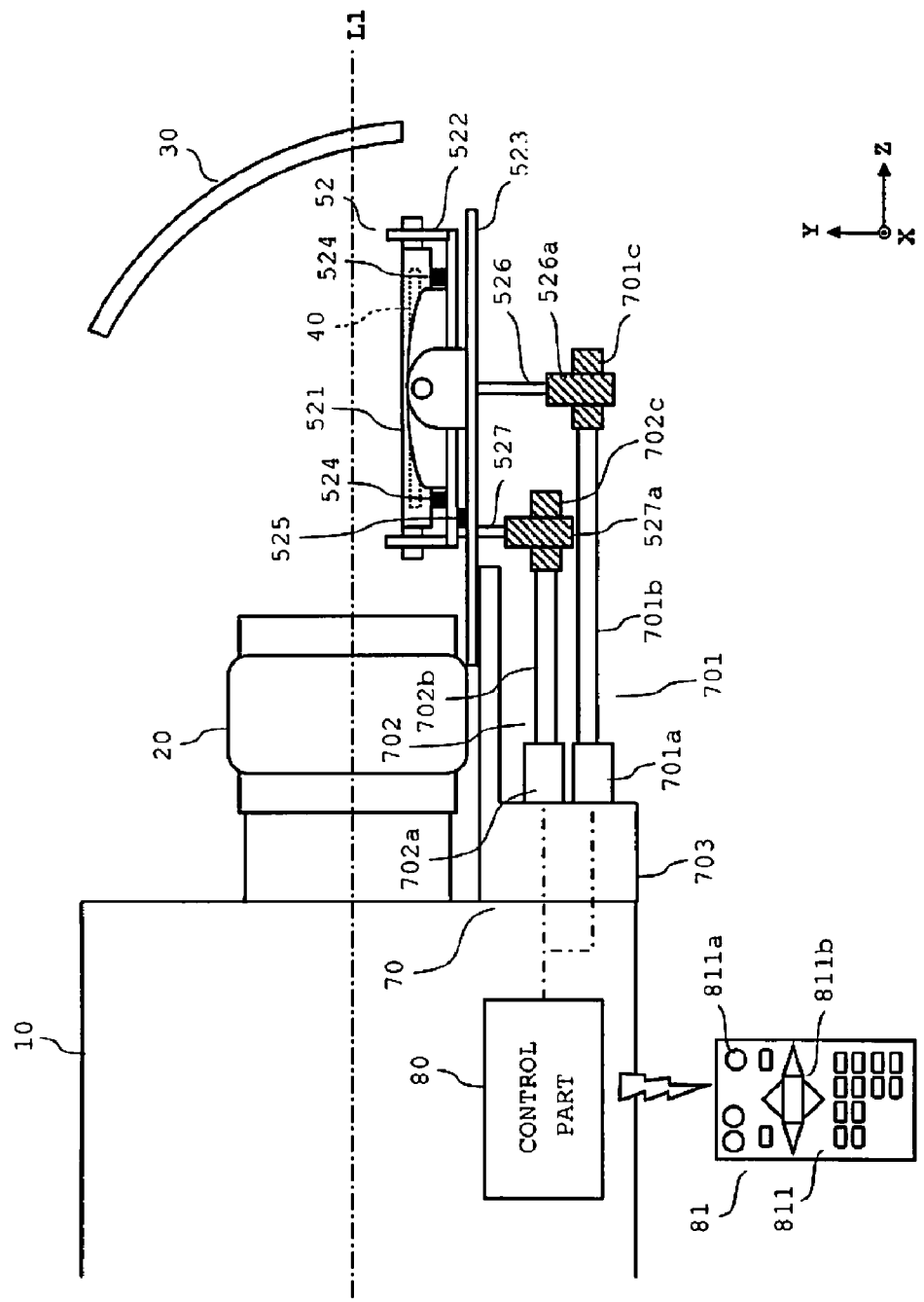
FIG. 13 is a diagram showing a configuration of the mirror actuator and a drive unit in the third embodiment.

Referring to FIG. 13, description will be provided as to a configuration of the mirror actuator 52 and drive unit 70. FIG. 13 is a side view of main parts of the projector with the cover 61 omitted.

The drive unit 70 includes a first drive part 701, a second drive part 702 and a holding part 703.

The first drive part 701 is intended to drive the first adjustment pin 526 and formed by a motor 701a, a shaft 701b, and a worm gear 701c. The motor 701a is fixed in a holding part 703 attached to the enclosure 10. The worm gear 701c is attached to an end of the shaft 701b extending forward from the motor 701a. The worm gear 701c engages the worm gear 526a of the first adjustment pin 526.

The second drive part 702 is intended to drive the second adjustment pin 527 and formed by a motor 702a, a shaft 702b, and a worm gear 702c. The motor 702a is fixed in the holding part 703 attached to the enclosure 10. The worm gear 702c is attached to an end of the shaft 702b extending forward from the motor 702a. The worm gear 702c engages the worm gear 527a of the second adjustment pin 527.

Further, the mirror actuator 52 is fixed in the holding part 703.

A control part 80 is provided in the enclosure 10 to control the drive unit 70. A remote controller 81 (hereinafter referred to as "remote") transmits an input signal to instruct the control part 80 to drive the drive unit 70. An operating plane 811 of the remote 81 includes a button 811a for making switchover to a distortion correction mode and a button 811b for instructing a tilt direction of the second reflecting mirror 40 in the distortion correction mode. In addition, an operating panel with operating buttons may be provided as an operating part on a side surface of the enclosure 10 (front, top, or right or left side surface).

The control part 80 controls driving (normal rotation, reverse rotation, or stoppage) of the motors 701a and 702a under instructions from the remote 81.

When the motor 701a rotates normally, the worm gear 526a is moved upward by rotation of the worm gear 701c to displace upward the first adjustment pin 526. When the motor 701a rotates reversely, the worm gear 526a is moved downward by rotation of the worm gear 701c to displace downward the first adjustment pin 526.

When the second reflecting mirror 40 is in parallel to the light axis L1 of the lens unit 20 (initial state), the first adjustment pin 526 is vertically displaced, a position of rotation of the mirror holding plate 521 regulated by the first adjustment pin 526 is vertically displaced. Accordingly, the mirror holding plate 521 rotates in an in-plane direction of an X-Y plane and the reflecting plane of the second reflecting mirror 40 is tilted in the in-plane direction of the X-Y plane from the initial state.

Similarly, when the motor 702a rotates in a normal or reverse direction, the second adjustment pin 527 is vertically displaced as the first adjustment pin 526 is.

When the second reflecting mirror 40 is in the initial state, vertical displacement of the second adjustment pin 527 causes a position of rotation of the first supporting plate 522 regulated by the second adjustment pin 527 to be vertically displaced. Accordingly, the first supporting plate 522 rotates in an in-plane direction of a Y-Z plane, and the reflecting surface of the second reflecting mirror 40 is tilted in the in-plane direction of the Y-Z plane from the initial state.

In the projector of this embodiment, a trapezoidal distortion occurs if a normal line to the screen surface is shifted from the light axis L1 of the lens unit 20, as in the first and second embodiments.

FIG. 14 is a diagram showing an adjustment example of a tilt of the second reflecting mirror 40 in correcting a vertical trapezoidal distortion. FIG. 15 is a diagram showing an adjustment example of a tilt of the second reflecting mirror 40 in correcting a horizontal trapezoidal distortion.

Figure 14A:
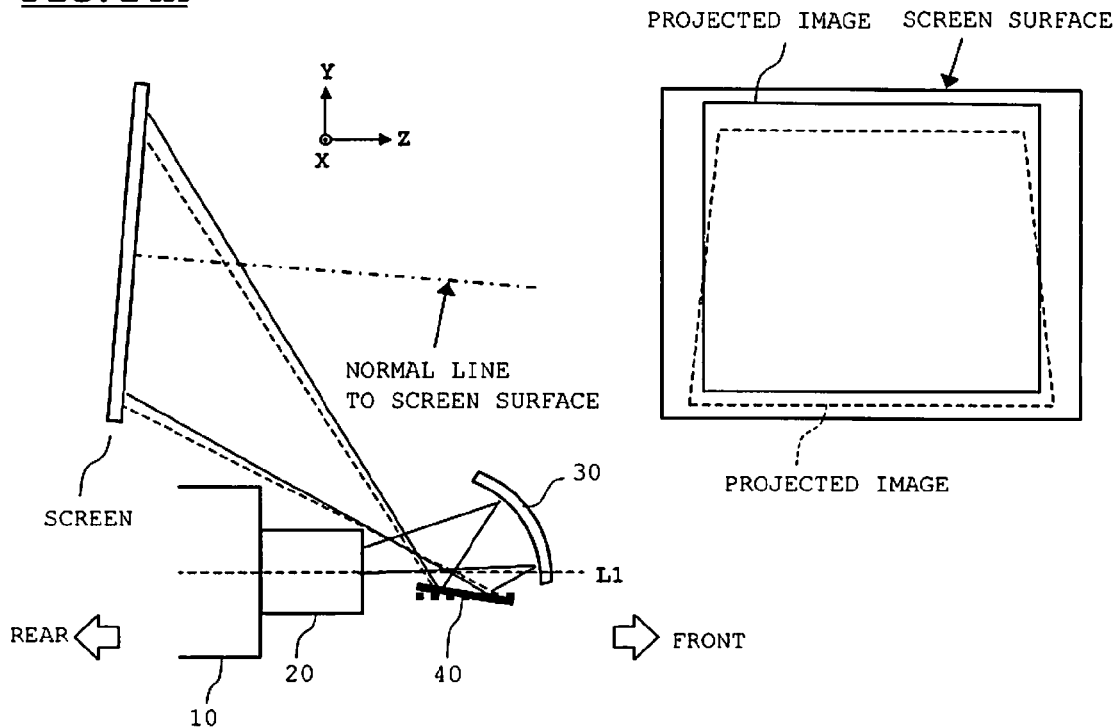
FIG. 14A is a diagram showing an adjustment example of a tilt of a second reflecting mirror in correcting a vertical trapezoidal distortion (lower trapezoidal distortion) in the projector of the third embodiment.
Figure 14B:
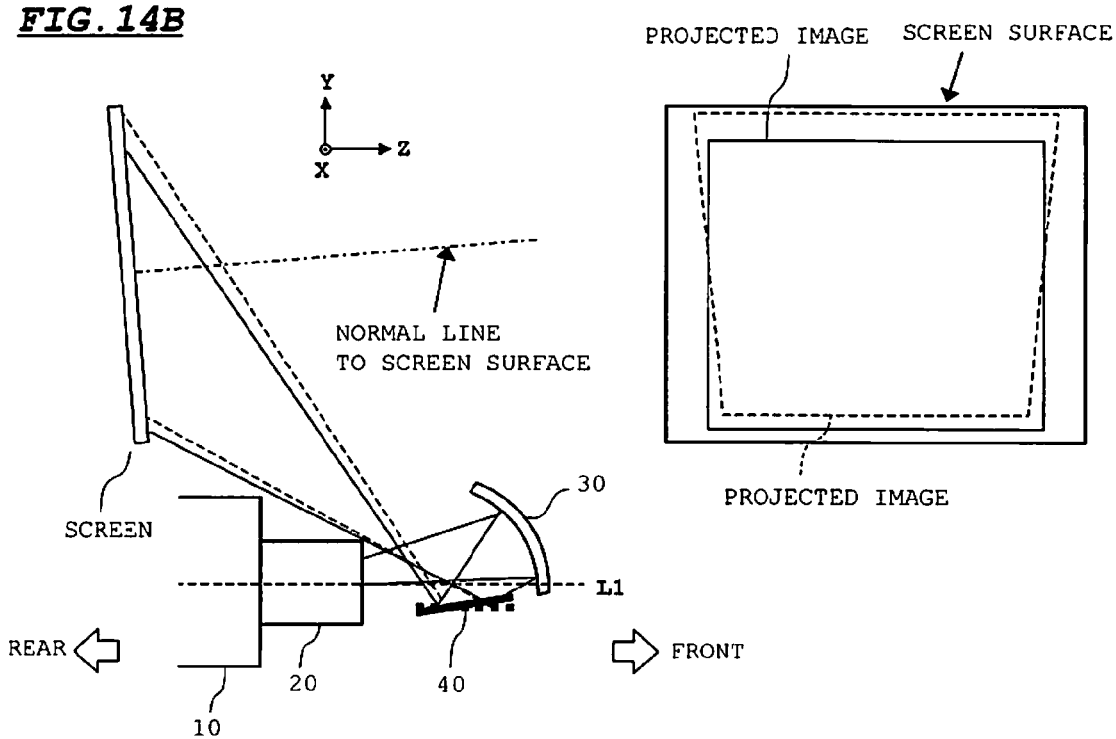
FIG. 14B is a diagram showing an adjustment example of a tilt of the second reflecting mirror in correcting a vertical trapezoidal distortion (upper trapezoidal distortion) in the projector of the third embodiment.

If a lower trapezoidal distortion occurs in a projected image as shown by dashed lines in FIG. 14A, the user operates the remote 81 to tilt the reflecting surface of the second reflecting mirror 40 in a clockwise direction. Accordingly, the projected image shifts in an upward direction in the screen and decreases gradually in difference of degree of magnification between upper and lower parts, thereby correcting the lower trapezoidal distortion. As above, when the lower trapezoidal distortion is eliminated and the projected image is turned into a proper shape as shown by solid lines in FIG. 14A, the user stops operating the remote 81 to fix the second reflecting mirror 40 in that position. Similarly, if an upper trapezoidal distortion occurs in a projected image as shown by dashed lines in FIG. 14B, the user may operate the remote 81 to tilt the reflecting surface of the second reflecting mirror 40 in a counterclockwise direction. When lower and upper trapezoidal distortions are corrected, vertical extension of the projected image is also eliminated, as in the first embodiment.

Figure 15A:
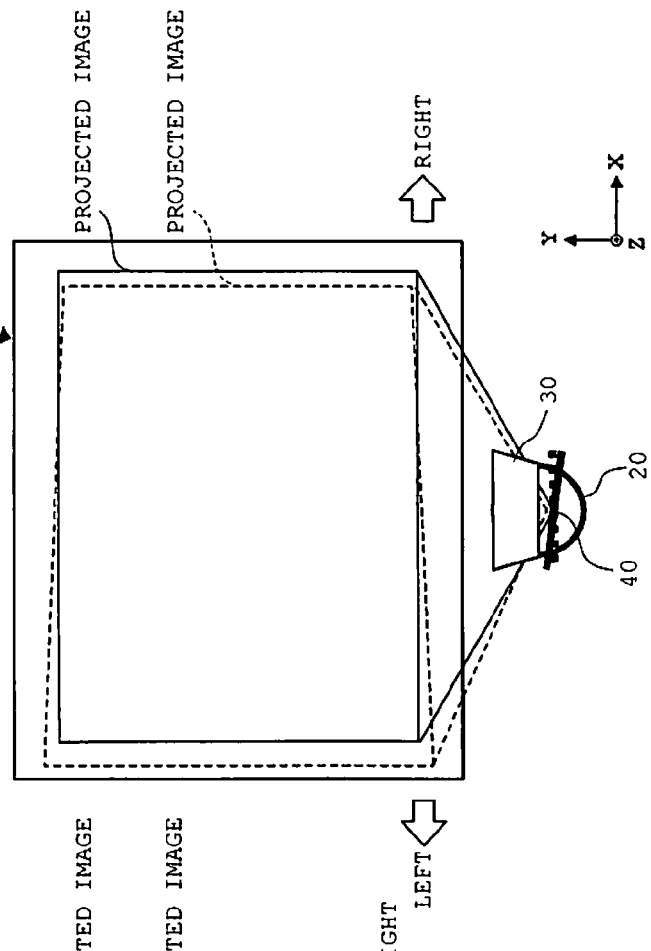
FIG. 15A is a diagram showing an adjustment example of a tilt of the second reflecting mirror in correcting a horizontal trapezoidal distortion (right trapezoidal distortion) in the projector of the third embodiment.
Figure 15B:
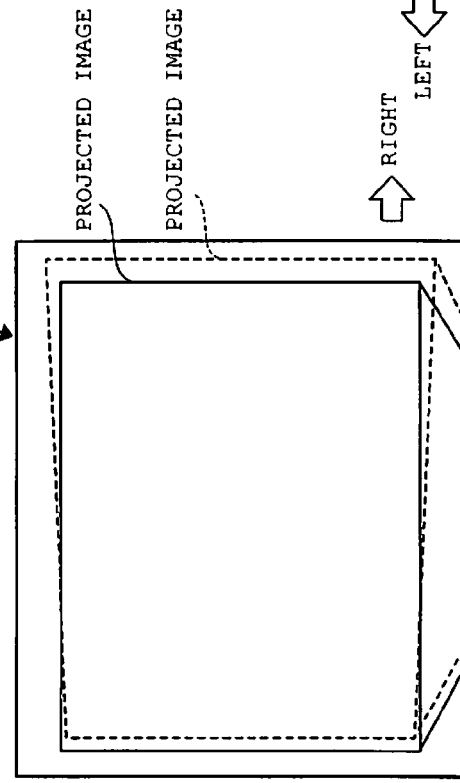
FIG. 15B is a diagram showing an adjustment example of a tilt of the second reflecting mirror in correcting a horizontal trapezoidal distortion (left trapezoidal distortion) in the projector of the third embodiment.

Further, if a right trapezoidal distortion occurs in a projected image as shown by dashed lines in FIG. 15A, the user may operate the remote 81 to tilt the reflecting surface of the second reflecting mirror 40 in a counterclockwise direction. Similarly, if a left trapezoidal distortion occurs in a projected image as shown by dashed lines in FIG. 15B, the user may operate the remote 81 to tilt the reflecting surface of the second reflecting mirror 40 in a clockwise direction.

Moreover, at occurrence of a combination of vertical and horizontal trapezoidal distortions, the second reflecting mirror 40 may be subjected to a combination of tilt adjustments.

Since a configuration of this embodiment is provided with a drive unit 70 for driving the mirror actuator 52 in response to an input signal and an operating part such as the remote 81 for inputting an instruction to drive the mirror actuator 52, the user is allowed to operate the operating part to adjust smoothly an angle of the second reflecting mirror 40, thereby simplifying correction of a trapezoidal distortion. In addition, since the mirror can be tilted vertically and horizontally, it is possible to correct smoothly not only a vertical trapezoidal distortion or a horizontal trapezoidal distortion, as described with regard to the first or second embodiment, but also both vertical and horizontal trapezoidal distortions and a combination of these distortions.

Fourth Embodiment

Figure 16:
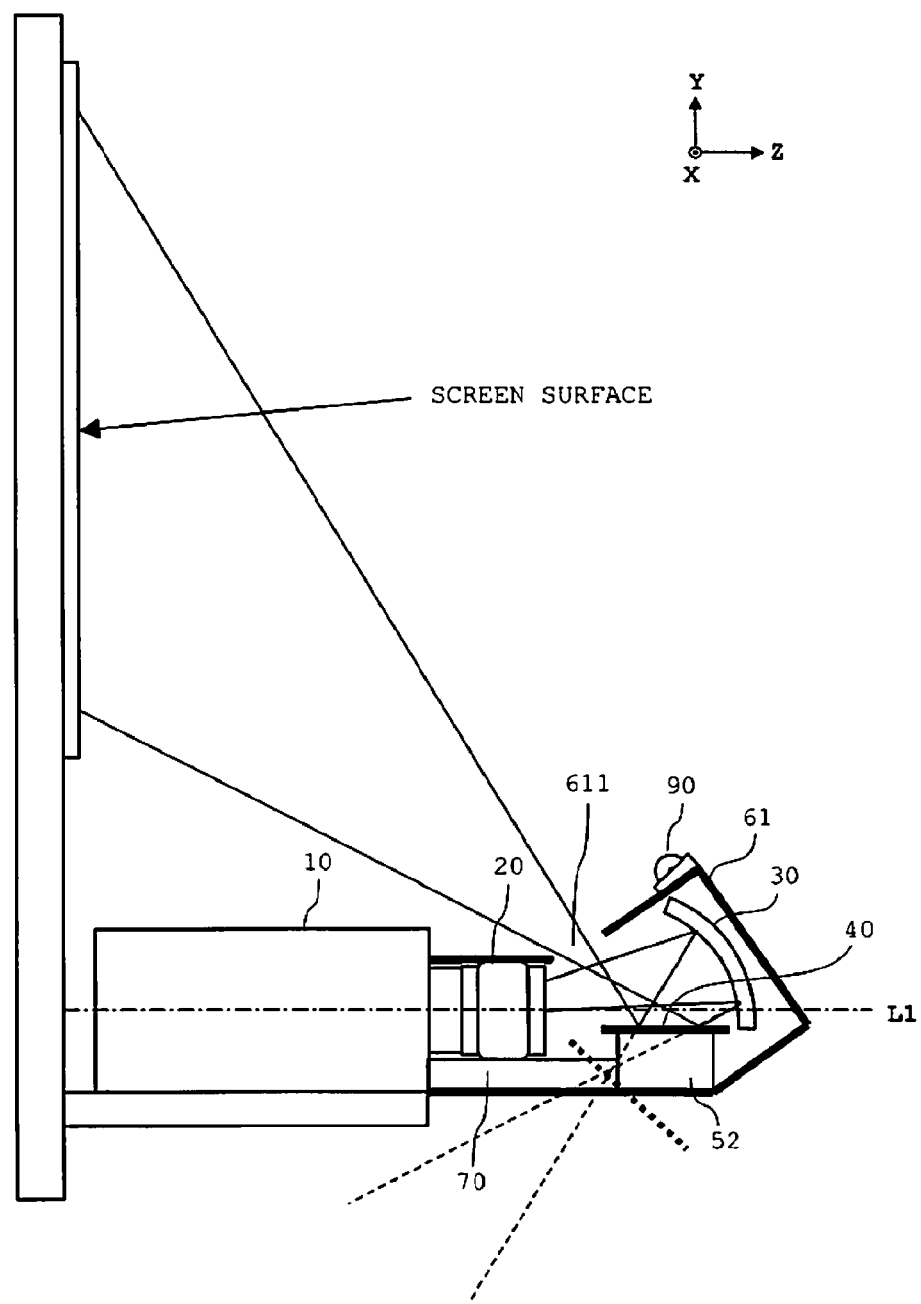
FIG. 16 is a diagram showing a configuration of a projector in a fourth embodiment.

FIG. 16 is a diagram showing a configuration of a projector in the fourth embodiment. In the projector of this embodiment, an image capturing part 90 is provided to automatically adjust a tilt of the second reflecting mirror 40 in accordance with a state of an actual projected image captured by the image capturing part 90 on a screen surface. The other parts of this embodiment are the same as those of the third embodiment, and thus given the same reference numerals as those of the parts in the third embodiment and not described here.

The image capturing part 90 is placed on the upper end portion of the cover 61 so as to be directed toward the screen surface. The image capturing part 90 is formed by an image capturing device such as a monochromatic CCD.

Figure 17:
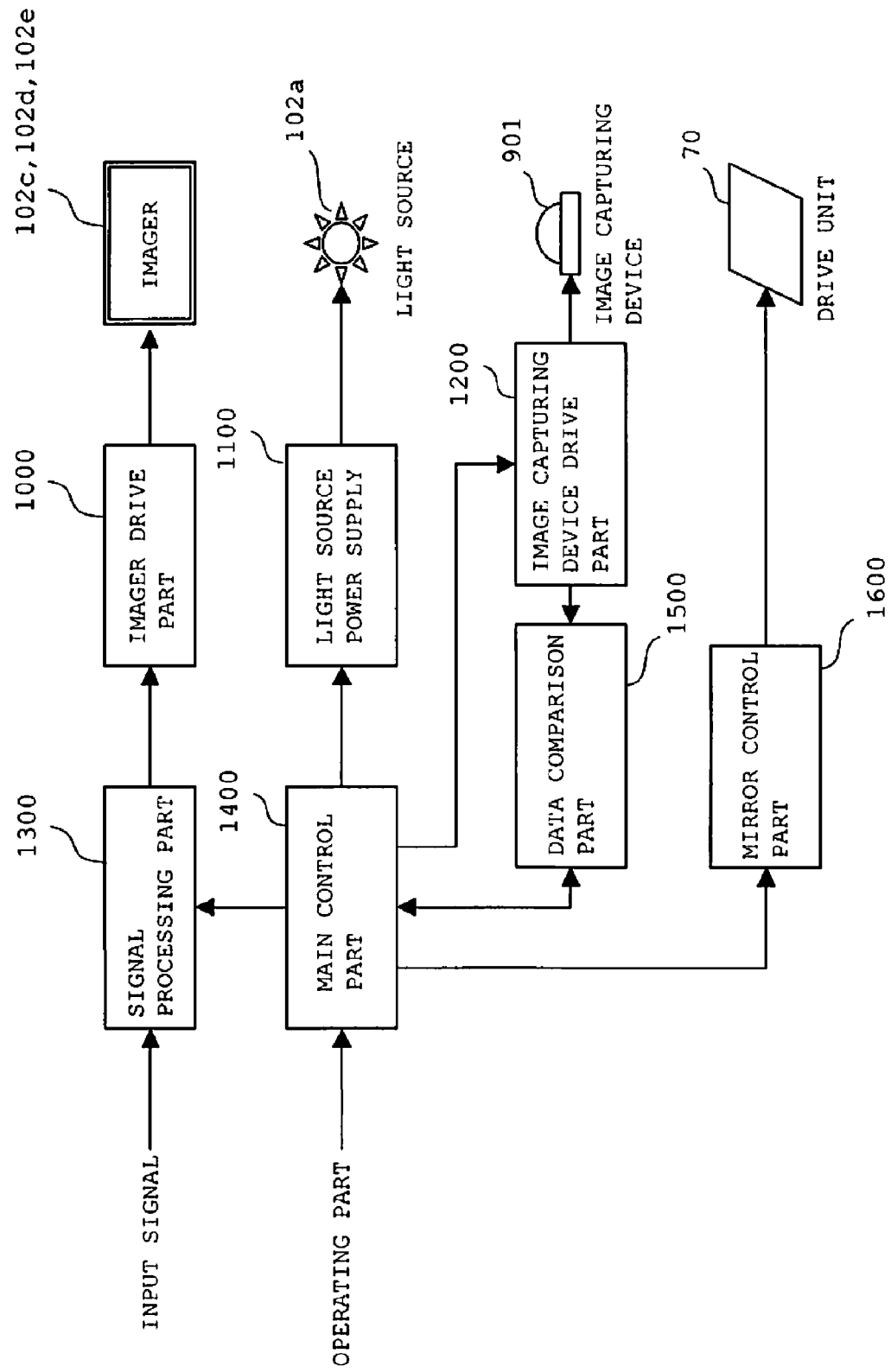
FIG. 17 is a functional block diagram showing a circuit system of the projector in the fourth embodiment.

FIG. 17 illustrates a circuit block diagram of the projector in this embodiment. The circuit system of the projector includes an imager drive part 1000, a light source power supply 1100, an image capturing device drive part 1200, a signal processing part 1300, a main control part 1400, a data comparison part 1500, and a mirror control part 1600.

The imager drive part 1000 draws a predetermined pattern on imagers 102c, 102d and 102e as shown in FIG. 2, in accordance with a drive signal from the signal processing part 1300.

The signal processing part 1300 (equivalent to a test image projection processing part of the present invention) carries out processes such as image quality adjustment and scaling, on an input signal such as an externally input image signal, generates a drive signal for a pattern to be drawn on the imagers 102c, 102d and 102e, and outputs the drive signal to the imager drive part 1000. The signal processing part 1300 also generates a test signal for distortion correction (drive signal for allowing the overall image region to be in white display) and outputs the signal to the imager drive part 1000, in accordance with instructions from the main control part 1400.

The light source power supply 1100 operates under instructions from the main control part 1400 and supplies electricity to the light source 102a. The image capturing device drive part 1200 drives the image capturing device 901 disposed on the image capturing part 90 and takes in an image signal captured by the image capturing device 901, under instructions from the main control part 1400. Then, the image capturing device drive part 1200 outputs the taken image signal to the data comparison part 1500.

The data comparison part 1500 processes the image signal from the image capturing device 901 as comparison data, performs a preset condition comparison, and then outputs a comparison result to the main control part 1400. The mirror control part 1600 controls driving of the motors 701a and 701b (refer to FIG. 13) in the drive unit 70, in accordance with instructions from the main control part 1400.

Figure 18:
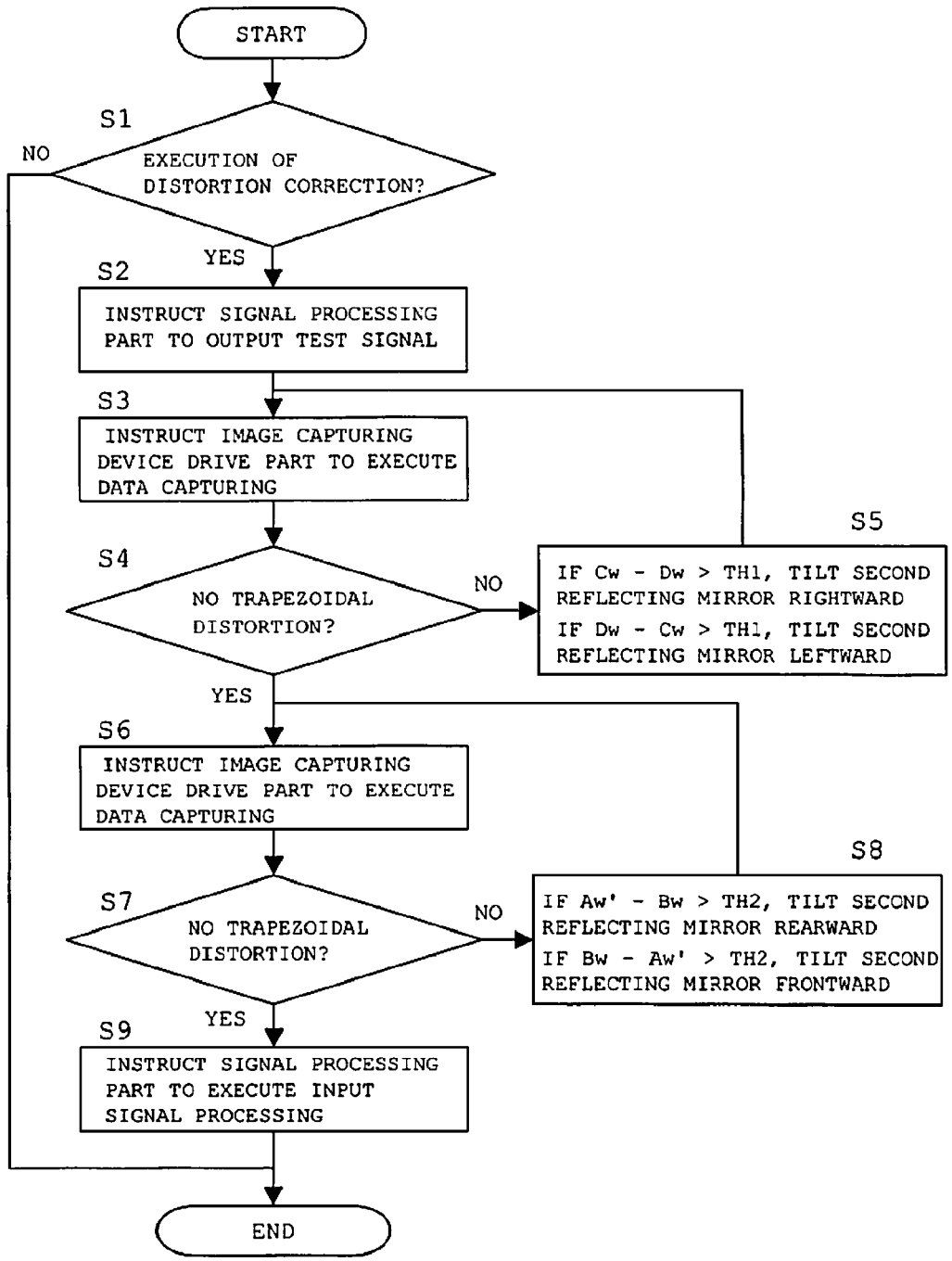
FIG. 18 is a flowchart showing a process flow of automatic correction of a trapezoidal distortion in the projector of the fourth embodiment.

FIG. 18 is a flowchart showing a process flow of automatic correction of a trapezoidal distortion in the foregoing circuit system. The process of automatic correction of a trapezoidal distortion will be now described with reference to the flowchart.

First, upon receipt of an instruction for distortion correction from the remote 81 (S1: YES), the main control part 1400 instructs the signal processing part 1400 to output a test signal for distortion correction (S2). This causes an image region in white display to be projected onto a screen surface.

Then, the main control part 1400 instructs the image capturing device drive part 1200 to take in image signal from the image capturing device 901 (S3). The image capturing device drive part 1200 thus takes in the image signal from the image capturing device 901 and inputs the image signal into the data comparison part 1500.

In response, the data comparison part 1500 performs a data comparison described below, and outputs a comparison result to the main control part 1400.

More specifically, the data comparison part 1500 detects a length (number of pixels) of a captured image (a region in white display) on straight lines which are equidistant from a center to right and left sides of the captured image (hereinafter a left-side straight line is referred to as "line C" and a right-side straight line is referred to as "line D"), as shown in FIG. 19, and then compares a length Cw of the line C to a length Dw of the line D.

If there is no trapezoidal distortion in the projected image on the screen and the length Cw and Dw on the captured image are almost the same, as shown in FIG. 19A, |Cw−Dw|≦TH1 is satisfied. In this case, the data comparison part 1500 outputs a detection signal indicative of no distortion to the main control part 1400.

Meanwhile, if there is a left trapezoidal distortion in the projected image on the screen and the length Cw is long and the length Dw is short in the captured image, as shown in FIG. 19B, Cw−Dw>TH1 is satisfied. In this case, the data comparison part 1500 outputs a detection signal indicative of a left trapezoidal distortion to the main control part 1400. Further, if there is a right trapezoidal distortion in the projected image on the screen and the length Dw is long and the length Cw is short in the captured image as shown in FIG. 19C, Dw−Cw>TH1 is satisfied. In this case, the data comparison part 1500 outputs a detection signal indicative of a right trapezoidal distortion to the main control part 1400. The threshold value TH1 is a threshold for assuming that there occurs no horizontal distortion.

Returning to FIG. 18, when the main control part 1400 determines that there is no occurrence of a trapezoidal distortion (S4: YES) based on the comparison result of the data comparison part 1500, the main control part 1400 moves to the next step S6. On the other hand, when the main control part 1400 determines that there is occurrence of a left or right trapezoidal distortion (S4: NO), the main control part 1400 instructs the mirror control part 1600 to adjust a horizontal tilt of the second reflecting mirror 40 so as to eliminate the trapezoidal distortion (S5). Then, if, even after re-execution of the steps S3, S4 and S5, the left or right trapezoidal distortion remains to be corrected, the horizontal tilt of the second reflecting mirror 40 is further adjusted. The steps S3, S4 and S5 is repeatedly performed until the lengths Cw and Dw in the captured image becomes almost the same and |Cw−Dw|≦TH1 is satisfied.

When the lengths Cw and Dw in the captured image has satisfied |Cw−Dw|≦TH1 by execution of these steps, the process moves to step S6. At step S6, the main control part 1400 instructs the image capturing device drive part 1200 to take in image signal from the image capturing device 901. Under this instruction, the image signal is taken in from the image capturing device 901 and the image signal is input into the data comparison part 1500.

Accordingly, the data comparison part 1500 performs a data comparison described below, and outputs a comparison result to the main control part 1400.

More specifically, the data comparison part 1500 detects a length (number of pixels) of a captured image (a region in white display) on straight lines which are equidistant from a center to upper and lower sides of the captured image (hereinafter an upper-side straight line is referred to as "line A" and a lower-side straight line is referred to as "line B"), as shown in FIG. 19, and then compares a length Aw of the line A to a length Bw of the line B.

Since the image capturing device 901 is here disposed on top of the cover 61 and captures a projected image on the screen in an oblique direction from below, the captured image has the shape of a trapezoid in which an lower base is longer than a upper base, even though there is no trapezoidal distortion in the projected image on the screen. Because of such a phenomenon, the data comparison part 1500 multiplies the length Aw of the line A by a correction coefficient K in accordance with an angle at which the image capturing device 901 sees the screen to thereby obtain Aw', and compares the obtained length Aw' with the length Bw of the line B.

If there is no vertical trapezoidal distortion in the projected image on the screen and the upper and lower bases of the image are almost equal in length as shown in FIG. 19A, |Aw'−Bw|≦TH2 is satisfied. In this case, the data comparison part 1500 outputs a detection signal indicative of no distortion to the main control part 1400. In contrast, if there is an upper trapezoidal distortion in the projected image on the screen and the upper base is longer than the lower base in the captured image as shown in FIG. 19D, Aw'−Bw>TH2 is satisfied. In this case, the data comparison part 1500 outputs a detection signal indicative of an upper trapezoidal distortion. Further, if there is a lower trapezoidal distortion in the projected image on the screen and the lower base is longer than the upper base in the captured image as shown in FIG. 19E, Bw−Aw'>TH2 is satisfied. In this case, the data comparison part 1500 outputs a detection signal indicative of a lower trapezoidal distortion. The threshold value TH2 is a threshold value for assuming that there occurs no vertical distortion.

Returning to FIG. 18, when the main control part 1400 determines that there is no occurrence of a vertical trapezoidal distortion (S7: YES) based on the comparison result of the data comparison part 1500, the main control part 1400 terminates correction of a trapezoidal distortion. Then, the main control part 1400 moves to step S9 to instruct the signal processing part 1300 to process an input image signal.

On the other hand, when the main control part 1400 determines that there is occurrence of an upper or lower trapezoidal distortion (S7: NO), the main control part 1400 instructs the mirror control part 1600 to adjust a forward or backward tilt of the second reflecting mirror 40 so as to eliminate the trapezoidal distortion (S8). Then, if, even after re-execution of steps S6, S7 and S8, the upper or lower trapezoidal distortion remains to be corrected, a counterclockwise or clockwise tilt of the second reflecting mirror 40 is further adjusted. Steps S6, S7 and S8 is repeatedly performed until the lengths Aw' and Bw on the captured image becomes almost equal and |Aw'−Bw|≦TH2 is satisfied.

When the lengths Aw' and Bw on the captured image have satisfied |Aw'−Bw|≦TH2 by execution of these steps, it is concluded that there is no more trapezoidal distortion, the trapezoidal distortion correction is terminated and the process moves to step S9.

In the configuration of this embodiment, an angle of the second reflecting mirror 40 is automatically corrected in response to occurrence of a trapezoidal distortion without manual adjustment. Accordingly, it is possible to correct a trapezoidal distortion more easily as compared to the case with manual correction.

As foregoing, preferred embodiments of the present invention have been described. However, the present invention is not restricted by the foregoing embodiments. In addition, embodiments of the present invention can be modified as appropriate in various manners in addition to the foregoing, within the scope of a technical idea defined in the claims.

What is claimed is:

1. A projection image display apparatus, comprising:
   a lens unit into which light modulated in accordance with an image signal is entered;
   a first mirror having a reflecting surface into which the light passing through the lens unit is entered and by which the light is converged;
   a second mirror for reflecting the light reflected by the first mirror; and
   a mirror actuator for changing a tilt angle of the second mirror with respect to the light.

2. A projection image display apparatus according to claim 1, wherein
   the second mirror is disposed in a first light path between the first mirror and a position of convergence of the light by the first mirror, or in a second light path between the position of convergence and a position where a light path length of the first light path is exceeded.

3. A projection image display apparatus according to claim 2, wherein
   the second mirror is disposed in the position of convergence of the light by the first mirror.

4. A projection image display apparatus according to claim 2, wherein
   the second mirror is disposed such that the light path of the light reflected by the second mirror intersects with the light path of the light passing through the lens unit.

5. A projection image display apparatus according to claim 1, comprising:
   an operating part for inputting an instruction to drive the mirror actuator; and
   a drive part for driving the mirror actuator in accordance with the instruction input via the operating part.

6. A projection image display apparatus according to claim 1, comprising:
   a drive part for driving the mirror actuator in accordance with a control signal;
   a detection part for detecting a state of projecting an image onto a projection plane; and
   a control part for inputting a control signal into the drive part based on a result of detection by the detection part.

7. A projection image display apparatus according to claim 6, wherein
   the detection part comprising:
   a test image projection processing part for projecting a test image onto the projection plane;
   an image capturing part for capturing the test image on the projection plane; and
   a distortion detection part for detecting a distortion in the projected image based on a state of projecting the test image captured by the image capturing part.

\* \* \* \* \*